(12) United States Patent
Yoshimuta

(10) Patent No.: US 10,859,410 B2
(45) Date of Patent: Dec. 8, 2020

(54) POSITION DETECTION APPARATUS, LENS APPARATUS, AND IMAGE PICKUP APPARATUS

(71) Applicant: CANON KABUSHIKI KAISHA, Tokyo (JP)

(72) Inventor: Junki Yoshimuta, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 661 days.

(21) Appl. No.: 15/243,198

(22) Filed: Aug. 22, 2016

(65) Prior Publication Data

US 2017/0069076 A1 Mar. 9, 2017

(30) Foreign Application Priority Data

Sep. 4, 2015 (JP) ................................. 2015-174259

(51) Int. Cl.
*G06T 7/00* (2017.01)
*G01B 11/14* (2006.01)
(Continued)

(52) U.S. Cl.
CPC ..... *G01D 5/34746* (2013.01); *G06K 9/00496* (2013.01); *G06K 9/03* (2013.01); *G06K 9/20* (2013.01)

(58) Field of Classification Search
CPC .. G01D 5/34746; G06K 9/00496; G06K 9/03; G06K 9/20
(Continued)

(56) References Cited

U.S. PATENT DOCUMENTS 4,010,376 A * 3/1977 Duck ................ H01L 27/14665
250/208.1
4,072,928 A * 2/1978 Wilder ..................... G06K 9/00
382/152
(Continued)

FOREIGN PATENT DOCUMENTS

JP H07270187 A 10/1995
JP H08178693 A 7/1996
(Continued)

OTHER PUBLICATIONS

Translation of Takahiro et al, JP 2015-028428, Feb. 12, 2015, [0009], [0026]. (Year: 2015).*
(Continued)

*Primary Examiner* — Matthew K Kwan
(74) *Attorney, Agent, or Firm* — Rossi, Kimms & McDowell LLP

(57) ABSTRACT

A position detection apparatus configured to detect a position of a test object includes a scale in which a plurality of patterns are arranged at cycles different from one another, a sensor configured to detect the plurality of patterns and to output a signal corresponding to a position of the test object relative to the scale, a first position calculator configured to calculate an absolute position of the test object based on the signal from the sensor, a determiner configured to determine a precision of the absolute position of the test object based on the signal from the sensor, and a controller configured to determine whether or not position information of the absolute position calculated by the first position calculator is to be used based on a determination result of the determiner.

20 Claims, 13 Drawing Sheets

(51) Int. Cl.
*G06K 9/62* (2006.01)
*G01D 5/347* (2006.01)
*G06K 9/20* (2006.01)
*G06K 9/00* (2006.01)
*G06K 9/03* (2006.01)

(58) Field of Classification Search
USPC .................................................. 348/136
See application file for complete search history.

(56) References Cited

U.S. PATENT DOCUMENTS

| | | | |
|---|---|---|---|
| 6,919,928 B1* | 7/2005 | Kanayama | G01D 5/2458 348/345 |
| 7,994,470 B2 | 8/2011 | Kusano | |
| 8,526,013 B2 | 9/2013 | Makiuchi et al. | |
| 9,228,857 B2 | 1/2016 | Shigeta | |
| 9,435,667 B2 | 9/2016 | Shigeta | |
| 2003/0117517 A1* | 6/2003 | Ogino | H04N 5/23212 348/356 |
| 2010/0073549 A1* | 3/2010 | Sekine | G03B 13/32 348/345 |
| 2011/0026040 A1* | 2/2011 | Makiuchi | G01B 7/30 356/614 |
| 2011/0266424 A1 | 11/2011 | Kawatoko et al. | |
| 2011/0317172 A1* | 12/2011 | Tamiya | G01B 11/0608 356/614 |
| 2013/0292557 A1* | 11/2013 | Nakamura | G01D 5/34776 250/231.1 |

FOREIGN PATENT DOCUMENTS

| | | |
|---|---|---|
| JP | 2005345375 A | 12/2005 |
| JP | 2007078357 A | 3/2007 |
| JP | 2009229396 A | 10/2009 |
| JP | 2010008696 A | 1/2010 |
| JP | 2010048607 A | 3/2010 |
| JP | 2010085254 A | 4/2010 |
| JP | 2011247879 A | 12/2011 |
| JP | 2013113634 A | 6/2013 |
| JP | 2013167775 A | 8/2013 |
| JP | 2013234852 A | 11/2013 |
| JP | 2014206429 A | 10/2014 |
| JP | 2014211589 A | 11/2014 |
| JP | 2015028428 A | 2/2015 |
| JP | 2015087193 A | 5/2015 |

OTHER PUBLICATIONS

Office Action issued in Japanese Appin. No. 2015-174259 dated Jun. 4, 2019. English translation provided.
Office Action issued in Japanese Appln. No. 2015-174259 dated Jan. 7, 2020. English translation provided.

* cited by examiner

POSITION DETECTION APPARATUS, LENS APPARATUS, AND IMAGE PICKUP APPARATUS

BACKGROUND OF THE INVENTION

Field of the Invention

The present invention relates to a position detection apparatus configured to detect a position of a test object, and a lens apparatus and image pickup apparatus each having the position detection apparatus.

Description of the Related Art

There are two types of position detection apparatuses, i.e., a relative position detection apparatus and an absolute position detection apparatus. The relative position detection apparatus optically or magnetically reads a movement of a predetermined cyclic pattern, such as a grating, provided on or in a scale, a disk, etc., and measures a position of a test object using a relative moving amount and reference position information. This apparatus can provide a nanometer resolution with a simple grating pattern, but cannot acquire absolute position information of the test object unless the reference position is detected.

The absolute position detection apparatus can acquire the absolute position information of the test object without detecting the reference position, by measuring a pattern, such as a gray code and an m-sequence code, using a light receiving element array.

Japanese Patent Laid-Open No. ("JP") 2007-78357 discloses detecting a reference position using an absolute position detection apparatus when the detection starts, so as to detect a relative position.

However, the absolute position information obtained from the absolute position detection apparatus is not always accurate, since the position detecting precision may degrade due to any scratches and contaminations on the pattern, influence of an external magnetic field for a magnetic sensor, and light quantity changes caused by variations with time in an optical sensor.

JP 2007-78357 relates to a technology for reducing the deterioration of the position detecting precision in the position detection apparatus. This position detection apparatus cannot guarantee the accuracy of the reference position when its position detection becomes actually imprecise, and consequently cannot fully exhibit its ability.

SUMMARY OF THE INVENTION

The present invention provides a position detection apparatus, a lens apparatus, and an image pickup apparatus, which can determine whether or not the position detection precision of an absolute position detection apparatus degrades, and provides proper information to be output based on the determination result.

A position detection apparatus according to one aspect of the present invention is configured to detect a position of a test object. The position detection apparatus includes a scale in which a plurality of patterns are arranged at cycles different from one another, a sensor configured to detect the plurality of patterns and to output a signal corresponding to a position of the test object relative to the scale, a first position calculator configured to calculate an absolute position of the test object based on the signal from the sensor, a determiner configured to determine a precision of the absolute position of the test object based on the signal from the sensor, and a controller configured to determine whether or not position information of the absolute position calculated by the first position calculator is to be used based on a determination result of the determiner.

Further features of the present invention will become apparent from the following description of exemplary embodiments with reference to the attached drawings.

DESCRIPTION OF THE EMBODIMENTS

Figure 1:
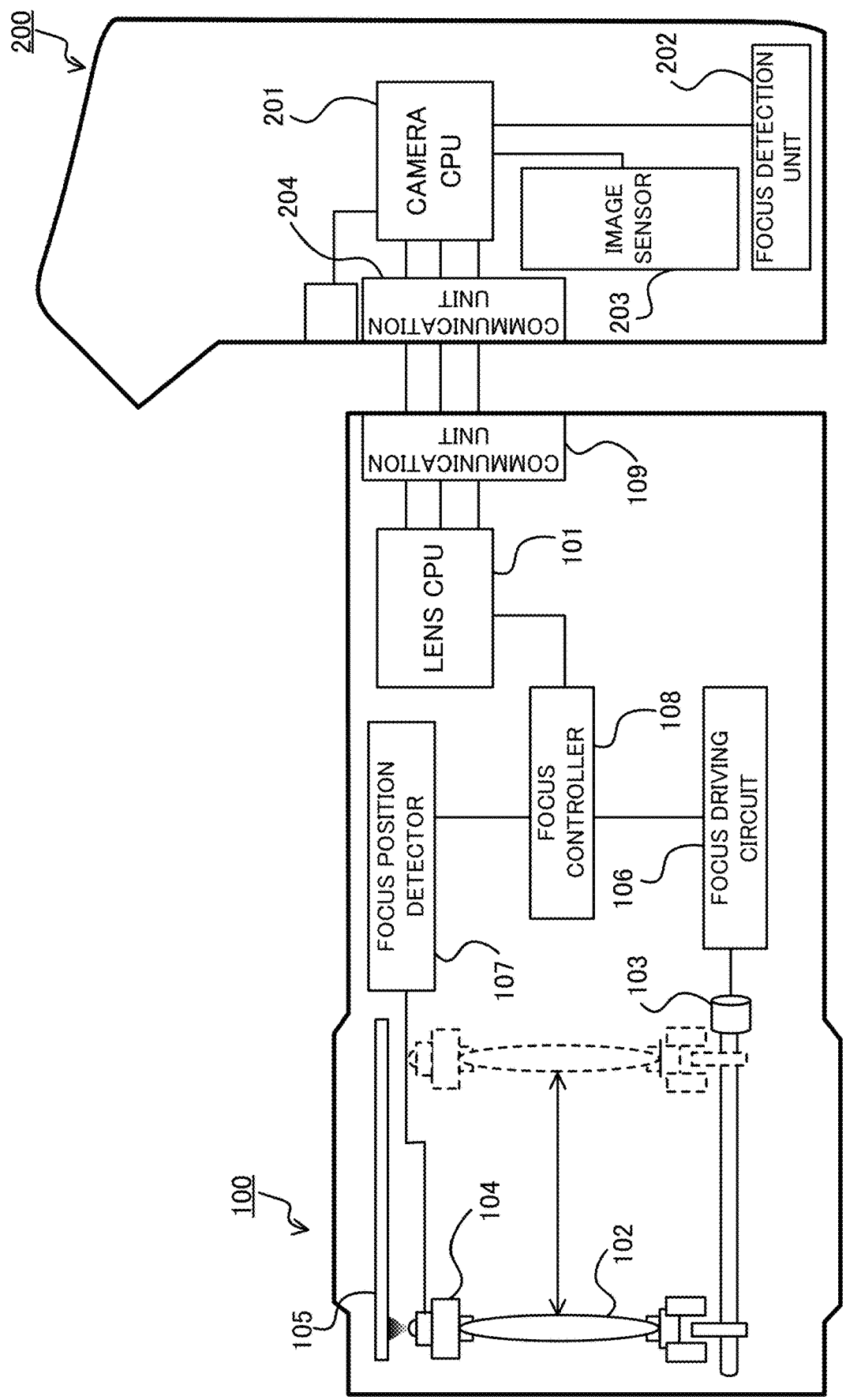
FIG. 1 is a block diagram of a camera system according to a first embodiment of the present invention.

Referring now to the accompanying drawings, a detailed description will be given of embodiments of the present invention. Corresponding elements in each figure will be designated by the same reference numerals, and a description thereof will be omitted.

First Embodiment

FIG. 1 illustrates a configuration of a camera system according to one embodiment of the present invention that includes an interchangeable lens 100 equipped with a position detection apparatus, and a camera body 200 detachably attached to the interchangeable lens 100.

The camera body 200 includes a camera CPU 201, a focus detection unit 202, an image sensor 203, and a camera communication unit 204.

The camera CPU 201 governs all operation controls in the camera body 200, and includes a memory, such as a RAM, a ROM, and an EEPROM. The camera CPU 201 finds an in-focus position on an object based on a focus detection result from the focus detection unit 202, and issues a driving command to a focus lens 102 (optical element) in the interchangeable lens 100 via the camera communication unit 204, if necessary.

The focus detection unit 202 detects a focus state of an image pickup optical system on the object using a light flux from the image pickup optical system in the interchangeable lens 100. The focus detecting method may be a phase difference detection method, a contrast detection method, and another method.

The image sensor 203 is a photoelectric conversion element, such as a CMOS and a CCD. A light flux through the image pickup optical system in the interchangeable lens 100 forms an image on the image sensor 203.

The camera communication unit 204 includes a plurality of communication terminals for communications with a lens CPU 101, which will be described later, sends a process request to the lens CPU 101 from the camera CPU 201, and receives a process request from the lens CPU 101. The power to the interchangeable lens 100 is supplied from an unillustrated power unit in the camera body 200 via the camera communication unit 204.

The interchangeable lens 100 includes a lens CPU 101, a focus lens 102, a focus driving motor 103, a position detection sensor 104, a scale 105, a focus driving circuit 106, a focus position detector 107, and a focus controller 108.

The lens CPU 101 controls an operation in the interchangeable lens 100 based on the process request from the camera CPU 201 and a status of each driving member in the interchangeable lens 100. The lens CPU 101 has a built-in memory, such as a RAM, a ROM, and an EEPROM.

The focus lens 102 is a test object of a position detection (object whose position is to be detected) in the present invention. The focus lens 102 is included in the image pickup optical system in the interchangeable lens 100, and a focus position (or focus lens position) for focusing an image changes when the focus lens 102 is moved in the optical axis direction. The focus lens 102 includes one or more of lenses made of glass of plastic. The focus lens 102 according to this embodiment is comprised by a single lens but may include a plurality of lenses according to the present invention.

The focus driving motor 103 is an actuator configured to drive the focus lens 102. The focus driving motor 103 includes an ultrasonic motor, a stepping motor, a brushless motor, a voice coil motor, a DC motor, etc.

The position detection sensor 104 is an optical sensor configured to detect an absolute position of the focus lens 102, and includes a light emitter and two light receiving element arrays. The position detection sensor 104 is attached to a holder of the focus lens 102, and moves as the focus lens 102 moves.

The scale 105 is fixed onto an unillustrated barrel plane in the interchangeable lens 100, and disposed at a position opposite to the position detection sensor 104. The scale 105 has a pattern used to detect an absolute position, and the reflectance of light from the light emitter differs according to the position on the scale. Thus, the focus position detector 107 can uniquely determine the position of the test object based on the position on the scale and sensor signals output from the position detection sensor 104. This embodiment employs a linear scale that extends parallel to the optical axis direction in the interchangeable lens 100, but the scale shape of the present invention is not limited to this embodiment and the scale may be wound in the radial direction of the interchangeable lens 100.

The focus driving circuit 106 is a motor driver configured to convert a driving command signal set by the focus controller 108, so as to drive the focus driving motor 103.

The focus position detector 107 calculates an absolute position of the focus lens 102 based on the sensor signals form the position detection sensor 104, and a relative position of the focus lens 102 calculated with a relative moving amount from a reference position. The focus position detector 107 determines whether or not the calculated absolute position is sufficiently precise, and outputs position information and a request signal of a recovery operation or the like to the focus controller 108 based on the determination result. The focus position detector 107 can be classified based on the internal process, as described later with reference to FIG. 2.

The focus controller 108 includes a software and a hardware circuit configured to control an operation related to the focus lens 102, and receives the driving command from the camera CPU 201 via the lens CPU 101. The focus controller 108 can receive, via the lens CPU 101, a command relating to a user operation in the interchangeable lens 100, such as an unillustrated focus manual ring operation, a zoom ring operation, and a focus preset operation. The focus controller 108 controls a driving process in accordance with the command. More specifically, the focus controller 108 determines whether the focus lens 102 is to be driven, sets an optimal driving velocity, and resets a driving amount, based on a driving command received from the lens CPU 101 and a driving status when the focus controller 108 receives the command so as to drive the focus driving motor 103 via the focus driving circuit 106.

This embodiment provides a position feedback control so as to determine the driving velocity of the focus driving motor 103 based on a difference between a target position set by the focus controller 108 and the position information of the focus lens 102. Therefore, the focus controller 108 refers to the position information of the focus lens 102 obtained from the focus position detector 107 in driving the focus driving motor 103.

The position information obtained by the focus position detector 107 may be provided to a member other than the focus controller 108 in the interchangeable lens 100 and the camera CPU 201. The present invention does not limit the driving control to the feedback control, and may use a feedforward control, a closed loop combined control, an open loop control, a sequence control, etc. The position detection apparatus according to this embodiment sets the focus lens 102 to the test object, but the present invention may set a zoom position, a radial position of the aperture blade, etc. to the test object.

Figure 2:
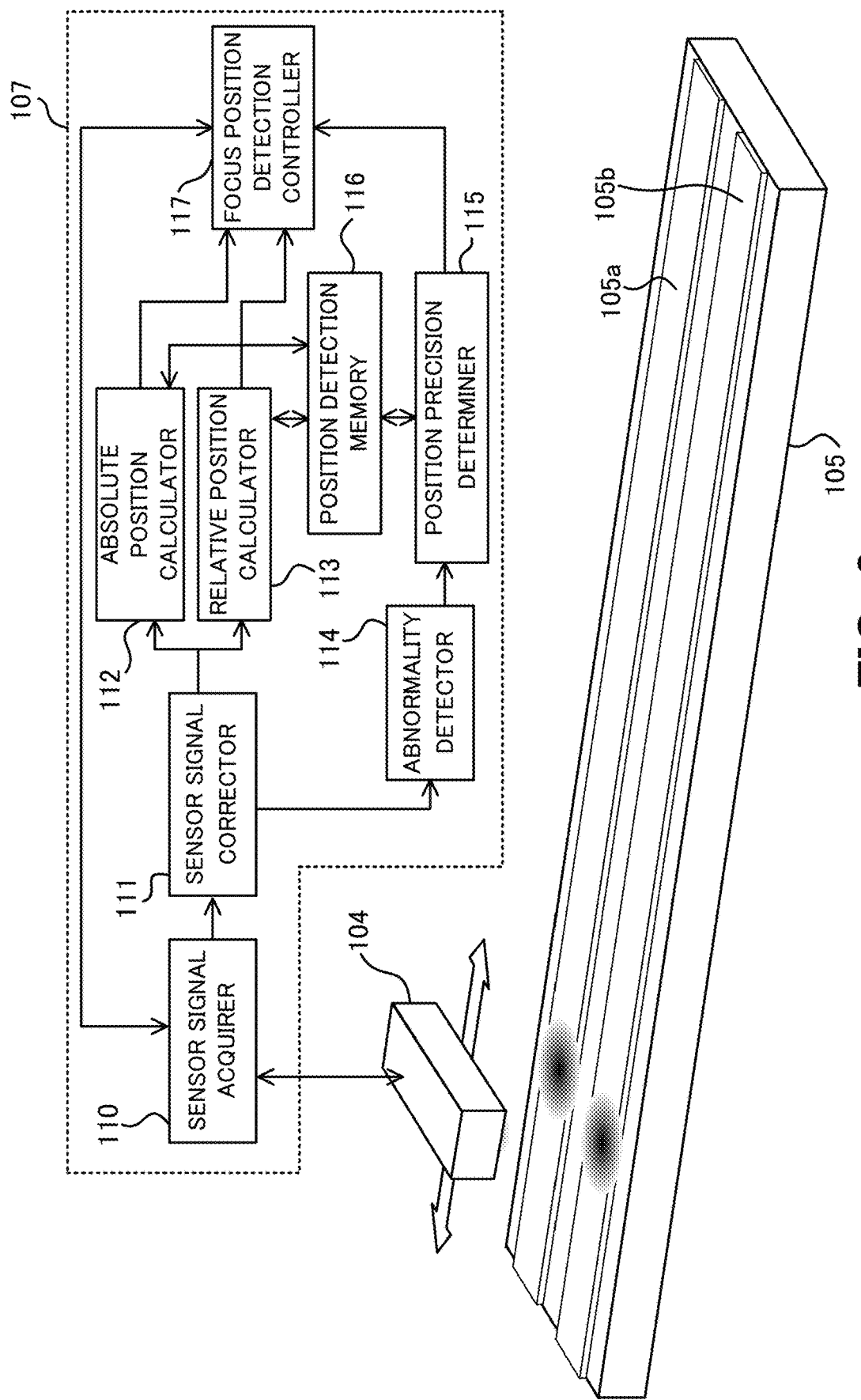
FIG. 2 is a schematic diagram illustrating a configuration of a position detection apparatus according to the first embodiment.

FIG. 2 is a block diagram illustrating a configuration of the position detection apparatus according to this embodiment.

As described above, the position detection apparatus according to this embodiment includes the position detection sensor 104, the scale 105, and the focus position detector 107.

The scale 105 includes two tracks, i.e., a main track 105a and a sub track (auxiliary track) 105b, as illustrated in FIG. 2. Each track includes two patterns having different cycles, and a cycle is also different between these tracks. The position detection sensor 104 includes one light emitter and two light receiving element arrays for decoding each of the main track 105a the sub track 105b. For example, the sensor signal for each pattern is acquired by changing the light receiving element array. In this embodiment, the position detection sensor 104 changes an arrangement of light receiving element array to be read based on the sensor internal process, and acquires reflected light of the object pattern. In this case, a sensor signal changes according to a reflected light amount, and a two-phase signal is obtained as a sensor output having a different phase from one pattern. This embodiment uses two patterns and two tracks, obtains totally eight sensor signals, and calculates the position of the scale 105 based on these signals or the absolute position of the focus lens 102.

The focus position detector 107 includes a sensor signal acquirer 110, a sensor signal corrector 111, an absolute position calculator 112, a relative position calculator 113, an abnormality detector 114, a position precision determiner 115, a position detection memory 116, and a focus position detection controller 117.

The sensor signal acquirer 110 performs an A/D conversion for a sensor signal as an analog output from the position detection sensor 104 into a digital signal with a predetermined resolution. The sensor signal acquirer 110 processes totally 12 signals that include the above eight signals used to calculate the absolute position and four signals used to detect the pattern abnormality on the scale 105. The sensor signal acquirer 110 changes a pattern to be obtained, in accordance with a command from the focus position detection controller 117. The sensor signal acquirer 110 performs an A/D conversion for the sensor signal at a timing when receiving the signal acquisition command from the focus position detection controller 117.

The sensor signal corrector 111 corrects the signal obtained by the sensor signal acquirer 110, and more specifically the correction process eliminates a harmonic component contained in the signal, correct the amplitude and phase difference between two-phase signals, and modify an offset value. As the sensor has a higher position resolution, the sensor signal change caused by a signal noise and a working environment is more sensitive to the precision in the position information. Therefore, this embodiment performs the correction process so as to reduce the influence of a signal noise etc.

The absolute position calculator 112 (first position calculator) calculates an absolute position of the focus lens 102 based on the eight signals obtained from the position detection sensor 104, as described in detail later.

The relative position calculator 113 (second position calculator) calculates a relative position of the focus lens 102 based on a two-phase signal obtained from a predetermined pattern among the eight signals obtained from the position detection sensor 104. The two-phase signal as a relative position detecting signal in this embodiment is a cyclic output signal like an ATAN signal illustrated in FIG. 3. The relative position calculator 113 reads the last relative position and relative position detecting signal, calculates a relative moving amount based on a difference between the last relative position detecting signal and the current relative position detecting signal, and calculates a relative position by adding the relative moving amount to the last relative position as the reference position. The position detection memory 116 stores the last relative position and the last relative position detecting signal. In the startup, the relative position calculator 113 sets the absolute position as the reference position (simply referred to as a "reference position" hereinafter) since there is no relative position to be referred to. When setting the reference position, the reference position calculator 113 outputs the reference position as the position information, and thereafter outputs the relative position calculated by the above calculation method. A detailed description will be given of the calculation process of the relative position calculator 113. While this embodiment calculates the relative position using the same scale and sensor as that of the absolute position detection apparatus, the present invention is not limited to this embodiment and may use a separate scale and a separate sensor to detect the relative position.

The abnormality detector 114 determines the degree of abnormality of the patterns on the main track 105a and the sub track 105b based on output levels of four signals used to detect the pattern abnormality on the scale 105 obtained from the sensor signal acquirer 110. The degree of abnormality is expressed as a deviation voltage from the output level as a reference, and the abnormality detector 114 outputs deviation voltages $V_{pEX}$ and $V_{pEX*}$ to the position precision determiner 115.

The position precision determiner 115 determines whether the precision of the absolute position of the focus lens 102 calculated by the absolute position calculator 112 is equal to or higher than a predetermined level, and outputs the determination result to the focus position detection controller 117. This embodiment estimates the precision of the absolute position based on plural pieces of information that contains the pattern abnormality level on the scale 105 and a difference value detection between a moving amount $\Delta ABS$ of the absolute position and a moving amount $\Delta REL$ of the relative position in the predetermined time period. In this embodiment, the predetermined time period is a cycle for updating the position information and a cycle at which the position information of the absolute position calculator 112 is updated is equal to a cycle at which the position information of the relative position calculator 113 is updated. This embodiment expresses the determination result of the normal state and the abnormal state in binary code, and the position precision determiner 115 outputs information on an abnormal item to the focus position detection controller 117. In other words, when the precision of the absolute position is equal to or higher than the predetermined level, the determination result becomes normal and when the precision of the absolute position is lower than the predetermined level, the determination result becomes abnormal.

The position detection memory 116 stores various correction information and threshold information necessary for the position detection apparatus. This embodiment mainly stores correction information of each signal used to calculate the absolute position, an absolute position as a design value on the driving end position of the focus lens 102, and the absolute position of the focus lens 102 at the driving end position obtained from the scale 105. This embodiment also stores the last relative position detection signal at a position information updating cycle used to calculate the relative position, the startup reference position, a reference level voltage used for the abnormality detector 114, and a determination threshold used for the position precision determiner 115. This embodiment further stores the last absolute position calculated by the absolute position calculator 112 at the position information updating cycle, the relative position calculated by the relative position calculator 113, and the determination result of the position precision determiner 115. Each of these values may be a design value, a fixed value set in the factory adjustment, or a variable value according to a state of at least one of the position detection apparatus, the focus lens 102, and the focus driving motor 103.

The focus position detection controller 117 integrally controls an operation relating to the focus position detection. The light receiving characteristic for the sensor signal acquirer 110 becomes unstable while and just after the light received pattern is changed, and the time is counted until the output becomes stable. The focus position detection controller 117 synchronizes an output timing of the absolute position calculator 112 with that of the relative position calculator 113.

The focus position detection controller 117 outputs the position information and the process request to the focus controller 108 outside the focus position detector 107 according to the determination result of the position precision determiner 115. The focus position detection controller 117 outputs the absolute position calculated by the absolute position calculator 112, when determining that the precision of the absolute position is equal to or higher than the predetermined level. When determining that the precision of the absolute position is lower than the predetermined level, the focus position detection controller 117 performs the following operation depending on a situation.

Initially, the precision of the absolute position when the interchangeable lens 100 starts is determined based only on the pattern abnormality on the scale 105 or the result of the abnormality detector 114. The focus position detection controller 117 outputs as the position information the predetermined position information, such as an optical infinity position in the telephoto state, and outputs a recovery operation request to the focus controller 108 so as to set the absolute position.

In the recovery operation, the focus position detection controller 117 stores the predetermined position information as the provisional reference position in the position detection memory 116, and outputs as the position information the relative position calculated by the relative position calculator 113 based on the provisional reference position. The focus position detection controller 117 outputs a driving stop request of the focus driving motor 103 at a timing when the pattern abnormality on the scale 105 is eliminated by the recovery operation. The position detection controller 117 reconfirms that the deviation voltages $V_{pEx}$ and $V_{pEx*}$ of the abnormality detector 114 are normal ($<V_{pEX,Th}$) after the driving stop, and withdraws the recovery operation request. The focus position detection controller 117 sets the absolute position calculated by the absolute position calculator 112 at this time to the reference position and stores the reference position in the position detection memory 116. The recovery operation in this embodiment is an operation for searching a position at which the pattern is normal on the scale 105 but may be an operation for removing foreign matters on the pattern or the sensor by vibrating or impacting the position detection sensor 104 and the scale 105. The recovery operation may return the focus lens 102 to the startup position.

Next, the precision of the absolute position after the interchangeable lens 100 starts is determined based on the pattern abnormality on the scale 105 and a moving amount difference value ΔABS−ΔREL between the moving amount ΔABS of the absolute position and the moving amount ΔREL of the relative position. When the post-startup precision of the absolute position is abnormal, the relative position calculated by the relative position calculator 113 is output as the position information.

When the pattern on the scale 105 is abnormal (when the pattern abnormality is detected), it is likely that the sensor signals obtained from the position detection sensor 104 are affected and a correct absolute position cannot be calculated. Accordingly, the deviation voltage from the reference level of the abnormality detection signal is set to the threshold $Vp_{Ex,Th}$ for a level where the absolute position cannot be normally output due to the previous measurement, so as to express a relationship between the precision deterioration of the absolute position and the deviation voltages $Vp_{Ex}$ and $Vp_{Ex*}$ of the abnormality detection signal.

The relative position calculation is more or less affected by any abnormal patterns in the configuration of this embodiment. Since the output value is less affected by the scratch and contamination on the pattern in comparison with the absolute position calculation, the influence is almost negligible and the relative position can be output as appropriate position information.

When the moving amount difference value is abnormal, the position precision determiner 115 determines the precision of the absolute position on the assumption that the relative position is proper position information. In other words, when there is a difference between the moving amounts ΔABS and ΔREL of the absolute position and the relative position in the predetermined time period, it is determined that the absolute position is not correctly calculated. One conceivable cause of the difference of the moving amount is a shift in the reading timings of the sensor signals in addition to the abnormality of the sensor signals.

It is necessary to change the light received pattern. A standby time period is also necessary to stabilize the light receiving characteristic. Therefore, a predetermined time period after a sensor signal of one pattern is obtained, a sensor signal of another pattern is obtained. While the focus lens 102 is being driven, a timing of acquiring a sensor signal is different between a pattern 1 and a pattern 2 and a timing shift amount becomes larger between patterns to be acquired as the driving velocity becomes higher.

One conceivable solution for this problem is to predict the shift amount of the sensor signal acquiring timing with the driving velocity and to correct the acquired sensor signals. However, when this correction fails, it is likely that a correct absolute position cannot be calculated. Since the relative position is position information calculated from the same pattern, the calculation of the relative position is not affected by the shift of the signal acquiring timing. When the interchangeable lens 100 starts, the focus lens 102 stops, and it is thus unnecessary to consider the moving amount difference value.

Figure 3:
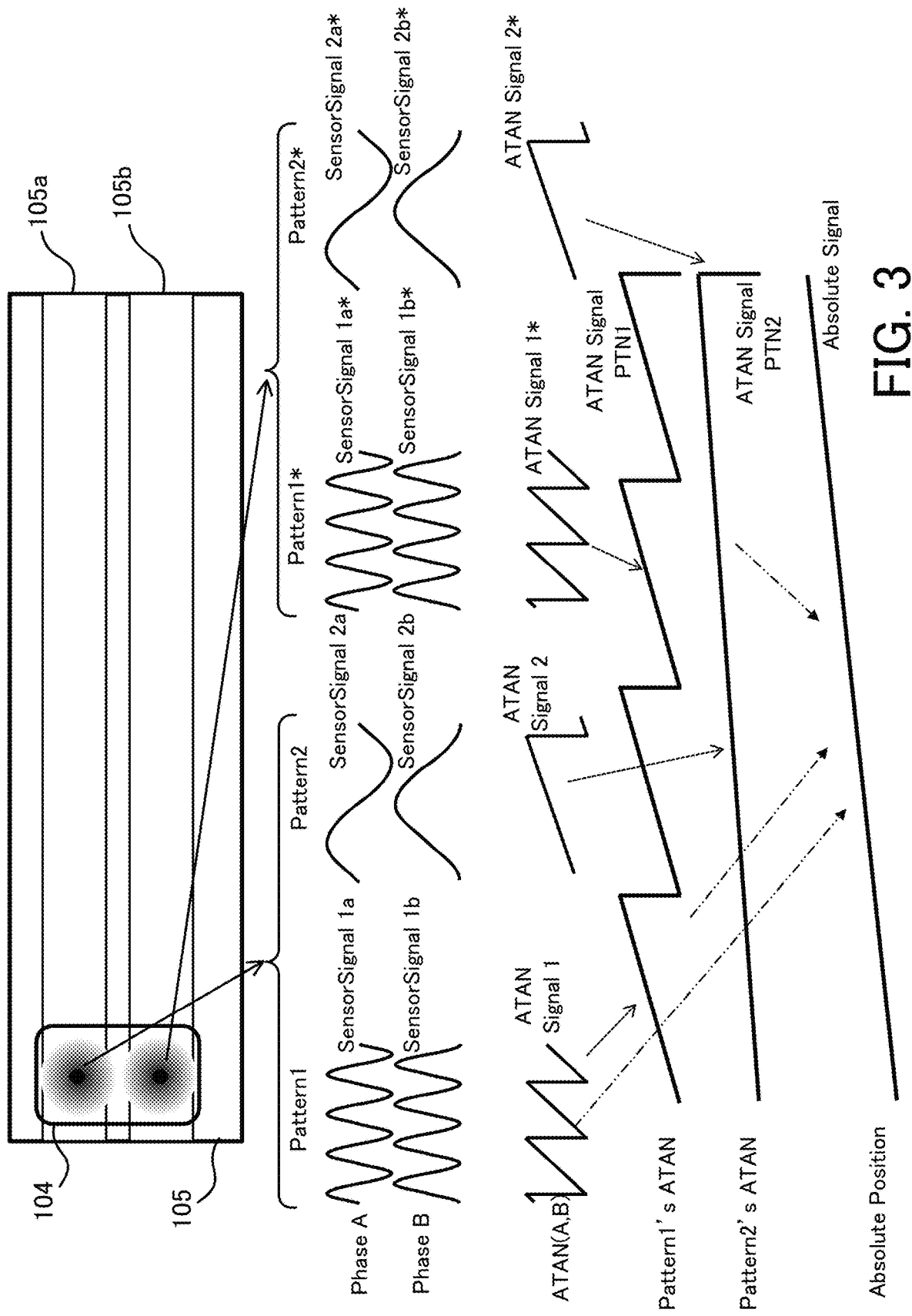
FIG. 3 is a view for explaining an absolute position calculation based on sensor signals according to the first embodiment.

FIG. 3 is a conceptual view of the absolute position signal calculated from the absolute position detection sensor and the scale according to this embodiment.

The scale 105 includes the main track 105a and the sub track 105b, and each track has two types of pattern columns having different cycles. The position detection sensor 104 includes one light emitters and two light receiving sensors, and moves as the focus lens 102 moves. Each light receiving sensor is disposed at a position opposite to a corresponding one of the main track 105a and the sub track 105b. The main track 105a includes the pattern 1 and the pattern 2. Sensor signals 1a and 1b are obtained from the pattern 1 as two-phase signals having different phases, and sensor signals 2a and 2b are obtained from the pattern 2 as two-phase signals having different phases.

The sub track 105b includes a pattern 1* and a pattern 2*, and two-phase signals (sensor signals 1a* and 1b*) having different phases are obtained from the pattern 1* and two-phase signals (sensor signals 2a* and 2b*) having different phases are obtained from the pattern 2*. A cycle is different between the pattern 1 and the pattern 1*. A cycle is different between the pattern 2 and the pattern 2*. The sub track 105b has a longer cycle.

The sensor signal corrector 111 performs a signal correction process for totally eight sensor signals, and the relative position calculator 113 then performs an arc tangent conversion between the two-phase signals of each pattern, and calculates four sawtooth wave signals or ATAN signals 1, 2, 1*, and 2*. The relative position calculator 113 uses the ATAN signal 1 as a relative position detection signal. Since the two-phase signal is an arc tangent signal, the signal is sufficiently precise unless a phase difference between the two-phase signals has a significant change.

ATAN signals PTN1 and PTN2 are obtained by again performing the arc tangent conversion between the ATAN signals 1 and 1* and between the ATAN signals 2 and 2* among the four sawtooth wave signals.

Using output values of the ATAN signals PTN1, PTN2, and 1, an absolute position detection signal can be obtained with a resolution corresponding to a relative position detection signal (ATAN signal 1). The output value of the ATAN signal 1 is less affected by noises, as described above. Since the ATAN signals PTN1 and PTN2 are generated from the sensor signals having different patterns, the output values are more affected by the noises than the ATAN signal 1. In other words, the precision of the absolute position may be lower than the relative position.

Figure 4:
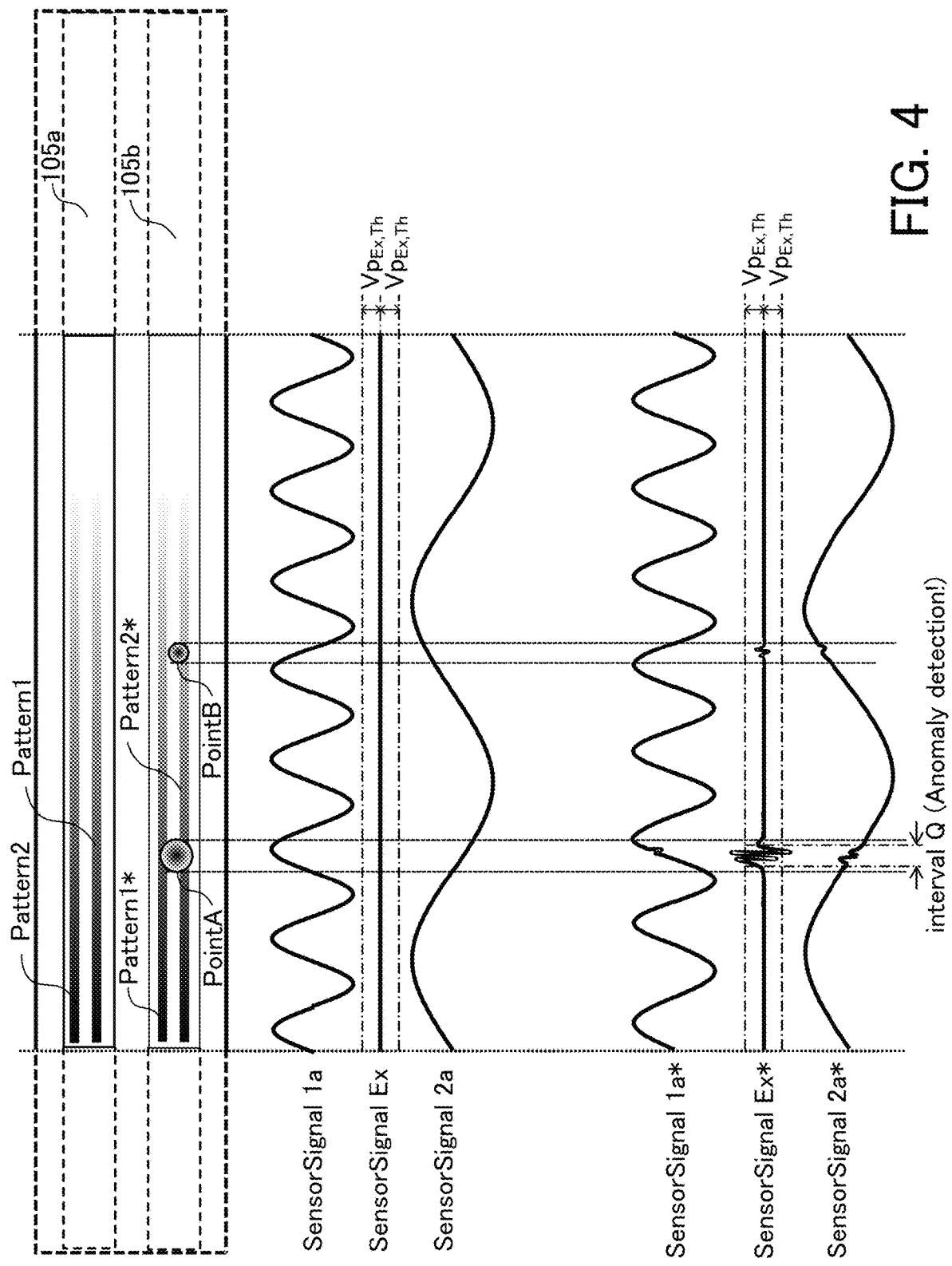
FIG. 4 is a view for explaining a pattern abnormality detection on a scale according to the first embodiment.

Referring now to FIG. 4, a description will be given of a method for detecting the pattern abnormality on the scale 105.

FIG. 4 illustrates output examples of the sensor signals in a predetermined interval on the scale 105. A description of a B-phase signal of each pattern will be omitted.

This embodiment obtains a sensor signal Ex as an abnormality detection signal from light reflected on a certain area (pattern Ex) between the patters 1 and 2. The sensor signal Ex includes a two-phase signal similar to another sensor signal. For the sub track 105b, this embodiment also obtains a sensor signal Ex* as the abnormality detection signal from light reflected on a certain area (pattern Ex*) between the patters 1* and 2*. The sensor signals Ex and Ex* are constant values when the patterns are normal in the light receiving area, and their output levels oscillate when the foreign matters, such as the dust and contamination, put on the patterns according to the area of the foreign matter. The patterns Ex and Ex* according to this embodiment have no reflective patterns.

For example, assume that there are foreign matters at points A and B in the sub track 105b on the scale 105. Each sensor output becomes a signal that contains a noise as illustrated at the underside in FIG. 4. The pattern abnormality on the sub track 105b does not affect the sensor signals 1a and 2a for the main track 105a. The sensor signal Ex that indicates the abnormality detection signal for the main track 105a has a constant value since the pattern is normal.

Since the foreign matter exists across both patterns of the sub track 105b at the point A, the reflectance changes at the point A and the sign waveforms of the sensor signals 1a* and 2a* deform for the sub track 105b, causing noises. The sensor signal Ex* causes an amplitude variation (noise component) according to a foreign matter area at the point A. Since the foreign matter puts only on the patter 2* at the point B, the sine waveform of the sensor signal 1a* is normal and the sine waveform of the sensor signal 2a* deforms. The sensor signal Ex* causes an amplitude variation according to the foreign matter area at the point B. Since the foreign matter area is larger at the point A than at the point B, the amplitude variation amount of the sensor signal Ex* is larger at the point A.

The amplitude variation beyond the threshold $vp_{Ex,Th}$ of the deviation voltage illustrated in FIG. 4 is detected in an interval Q at the point A. The position precision determiner 115 determines that there is abnormality on the pattern, and prohibits the absolute position as the position information from being output, and outputs the relative position instead.

Referring now to flowcharts illustrated in FIGS. 5, 6a, 6b, 7a, and 7b, a detailed description will be given of the processes of the position detection apparatus according to this embodiment.

Figure 5:
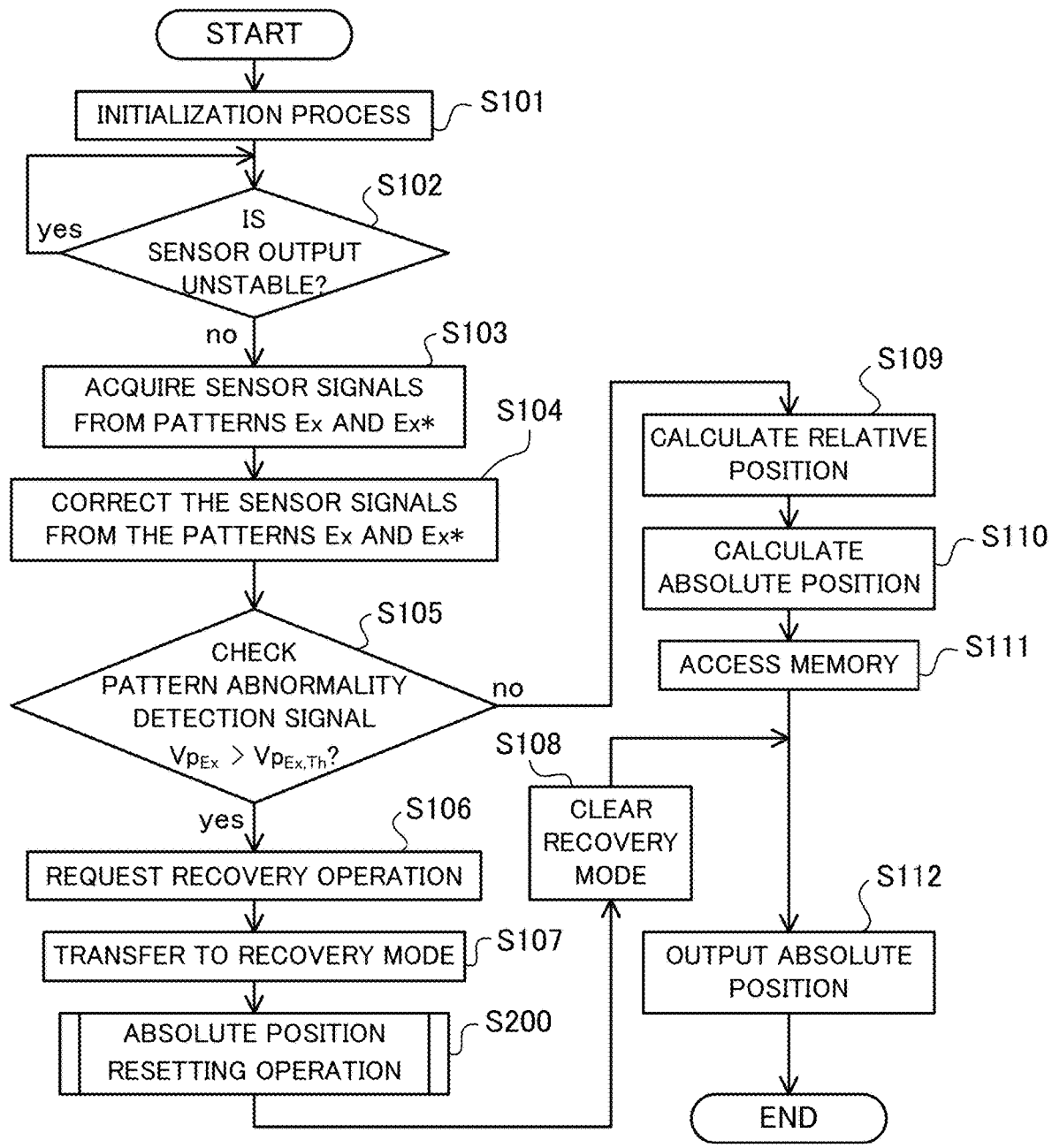
FIG. 5 is a flowchart illustrating a startup process for the position detection apparatus according to the first embodiment.

Initially, a description will be given of the startup process with reference to FIGS. 5, 6a, and 6b.

In the step S101, the focus position detection controller 117 performs an initialization process. The focus position detection controller 117 applies a power voltage to the position detection sensor 104 so as to start it and to activate the light receiving element arrays corresponding to the initially detected patterns. The focus position detection controller 117 starts counting the time after the light receiving element arrays are set. The focus position detection controller 117 reads out of the position detection memory 116, the correction value or the calculation coefficient used for the sensor signal corrector 111, the absolute position calculator 112, or the relative position calculator 113. The focus position detection controller 117 reads out of the position detection memory 116, the determination threshold used to determine the precision of the absolute position in the position precision determiner 115. After the step S101 ends, the procedure moves to the step S102.

In the step S102, the focus position detection controller 117 determines whether or not the standby time period for stabilizing the light receiving characteristic (output) has elapsed after the patterns to be read are changed. The elapsed time is monitored by counting the time in the focus position detection controller 117. The focus position detection controller 117 moves to the step S103 when determining that the predetermined time period has elapsed, and again repeats this determination in the step S102 after the focus position detection controller 117 waits for the predetermined time period when determining that the predetermined time period has not yet elapsed.

In the step S103, the focus position detection controller 117 makes the sensor signal acquirer 110 acquire the sensor signals for the patterns Ex and Ex* as the abnormality detection signals. The two-phase signals as sensor signals Exa and Exb are generated from the pattern Ex formed on the main track 105a, and the two-phase signals as sensor signals Exa* and Exb* are generated from the pattern Ex* formed on the sub track 105b. After the step S103 ends, the procedure moves to the step S104.

In the step S104, the focus position detection controller 117 makes the sensor signal corrector 111 correct the abnormality detection signals (sensor signals Exa, Exb, Exa*, and Exb*). Herein, the correction process of the abnormality detection signals eliminates only a harmonic component. After the step S104 ends, the procedure moves to the step S105.

In the step S105, the focus position detection controller 117 makes the position precision determiner 115 determine whether or not the pattern on the scale 105 is abnormal, using the abnormality detection signals from the abnormality detector 114. More specifically, the focus position detection controller 117 calculates the deviation voltage Vp relative to the offset voltage of the premeasured abnormality detection signal through the abnormality detector 114, and compares it with the deviation voltage threshold $Vp_{Ex,Th}$ used to detect the pattern abnormality by the position precision determiner 115. The position precision determiner 115 determines that the deviation voltage Vp or higher than the deviation voltage threshold $Vp_{Ex,Th}$ is abnormal, and the deviation voltage Vp equal to or lower than the deviation voltage threshold $Vp_{Ex,Th}$ is normal. The offset voltage of the premeasured abnormality detection signal and the deviation voltage threshold $Vp_{Ex,Th}$ may have separate values for each abnormality detection signal or have the same values for simplicity.

The focus position detection controller 117 according to this embodiment measures the offset voltage for each abnormality detection signal, and maintains a single value for the deviation voltage threshold $Vp_{Ex,Th}$. When the abnormality is detected, the procedure moves to the step S106, when the abnormality is not detected, the procedure moves to the step S109.

When the absolute position calculation is determined unstable (when the pattern abnormality is found on the scale 105) in the startup in the step S105, the focus position detection controller 117 outputs the recovery operation request to the focus controller 108 in the step S106. In this case, the focus position detection controller 117 outputs the position information of the optical infinity as the provisional position information irrespective of the actual position of the focus lens 102. When the recovery operation request is output to the focus controller 108, the information is transmitted to the lens CPU 101. In response, the lens CPU 101 issues the driving control command to the focus controller 108, and the recovery operation is implemented based on this command. After the step S106 ends, the procedure moves to the step S107.

In the step S107, the focus position detection controller 117 turns to the recovery mode. Since the absolute position is not determined in the recovery mode, a high speed process is performed without acquiring the sensor signals from the patterns 2 and 2* unless the pattern abnormality state on the scale 105 changes. In the step S107, the focus position detection controller 117 stores the position information of the optical infinity as the provisional reference position in the position detection memory 116.

In the step S107, the patterns to be read by the light receiving element arrays are changed from the patterns Ex and Ex* to the patterns 1 and 1*, and the sensor signal acquirer 110 acquires the sensor signals 1a, 1b, 1a*, and 1b*. The sensor signal corrector 111 corrects the acquired sensor signals, and the relative position calculator 113 calculates the ATAN signal 1 as the relative position detection signal, and stores the output value of the relative position detection signal in the position detection memory 116. After the step S107 ends, the procedure moves the step S200 as the following subroutine.

When the absolute position information is determined by the absolute value reset operation in the step S200, the focus position detection controller 117 clears the recovery mode in the step S108. Thereafter, the procedure moves to the step S112.

When it is determined in the step S105 that the pattern abnormality is not detected on the scale 105, the absolute position calculator 112 and the relative position calculator 113 calculate the absolute position and the relative position and output the position information to the focus position detection controller 117 in the step S109 and the subsequent steps, as detailed below.

In the step S109, the relative position calculator 113 calculates the relative position. The light receiving element arrays are changed to the patterns 1 and 1*, and the sensor signal acquirer 110 acquires the sensor signals 1a, 1b, 1a*, and 1b* after the light receiving characteristic becomes stable. The sensor signals 1a* and 1b* are not necessary to calculate the relative position but used to calculate the absolute position in the following stage, and thus are obtained in the step S109. The sensor signal corrector 111 corrects the acquired sensor signals, and the relative position calculator 113 calculates the ATAN signal 1.

Since the startup relative position can be regarded as the reference position, the relative position is also set in the absolute position calculation in the next step S110. For the next relative moving amount calculation, the focus position detection controller 117 stores the output value of the ATAN signal 1 as the relative position detection signal in the position detection memory 116 in the step S109. After the step S109 ends, the procedure moves to the step S110.

In the step S110, the absolute position calculator 112 calculates the absolute position. The light receiving element arrays are changed to the patterns 2 and 2*, and the sensor signal acquirer 110 acquires the sensor signals 2a, 2b, 2a* and 2b* after the light receiving characteristic becomes stable. The sensor signal corrector 111 corrects the acquired sensor signals, and the absolute position calculator 112 calculates the absolute position detection signal using the corrected sensor signals from the patterns 1 and 1* in the step S109. The calculated absolute position detection signal has an error relative to a design position due to the attachment errors of the scale 105 and the position detection sensor 104. Thus, the correction process is necessary to maintain a predetermined relationship between the actual position of the focus lens 102 and the absolute position detection signal. For example, the correction process subtracts a difference between an output value of the absolute position detection signal at the end position in the movable range of the focus lens 102 stored in the position detection memory 116 and a design end position in the factory adjustment, from the absolute position detection signal calculated in the step S110. Thereby, the above error component can be eliminated, and the corrected value is set to the absolute position calculated by the absolute position calculator 112. After the step S109 ends, the procedure moves to the step S111.

In the step S111, the focus position detection controller 117 accesses the position detection memory 116. More specifically, the absolute position calculated in the step S111 is stored as the absolute position information and the reference position, and the output value of the relative position detection signal calculated in the step S110 is also stored. After the step S111 ends, the procedure moves to the step S112.

In the step S112, the focus position detection controller 117 outputs as the position information the absolute position having the guaranteed precision, which has been calculated by the absolute position calculator 112, to the focus controller 108. This process ends the startup procedure of the position detection apparatus.

Figure 6A:
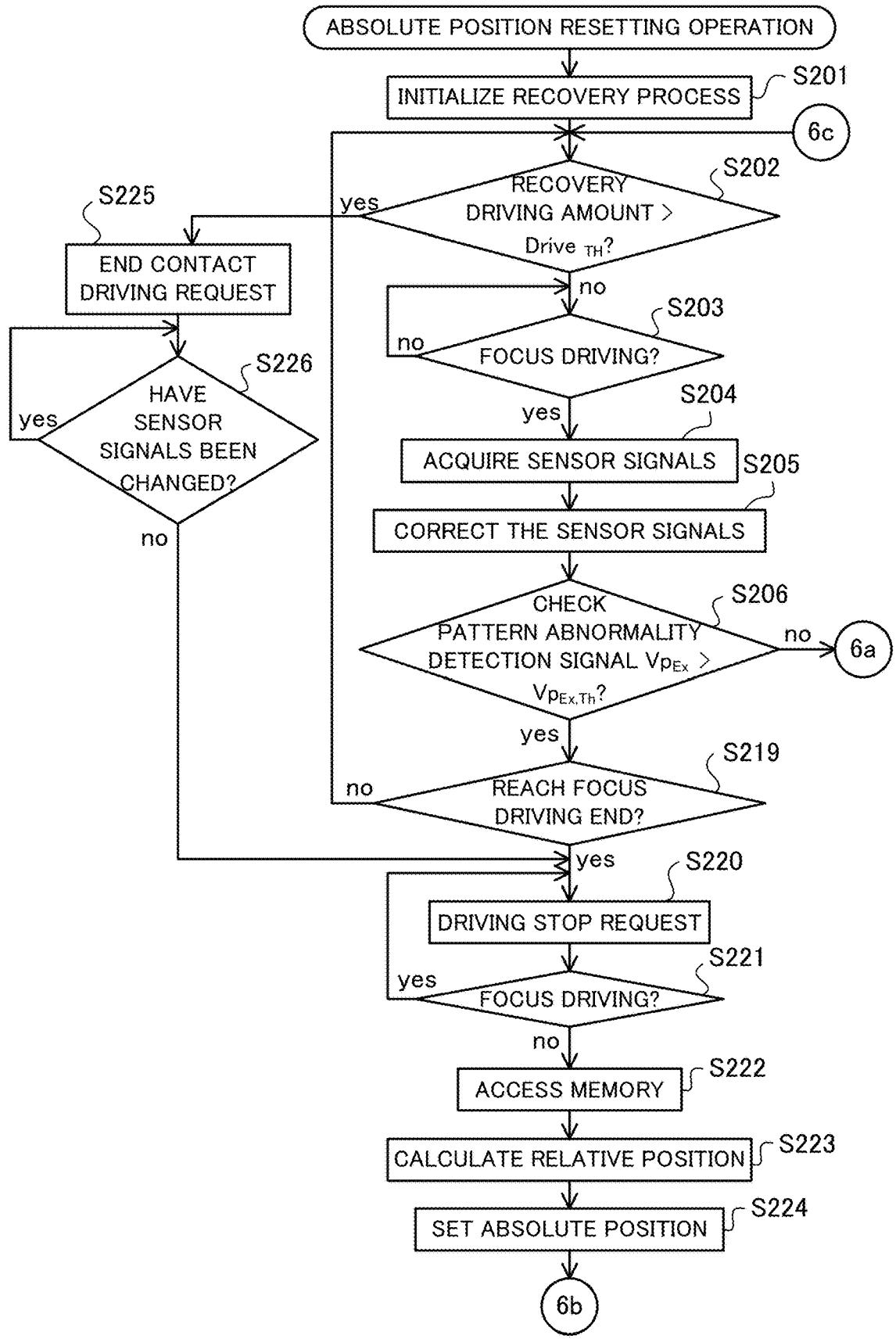
FIGS. 6A and 6B are flowcharts of an operation in an absolute position resetting operation according to the first embodiment.
Figure 6B:
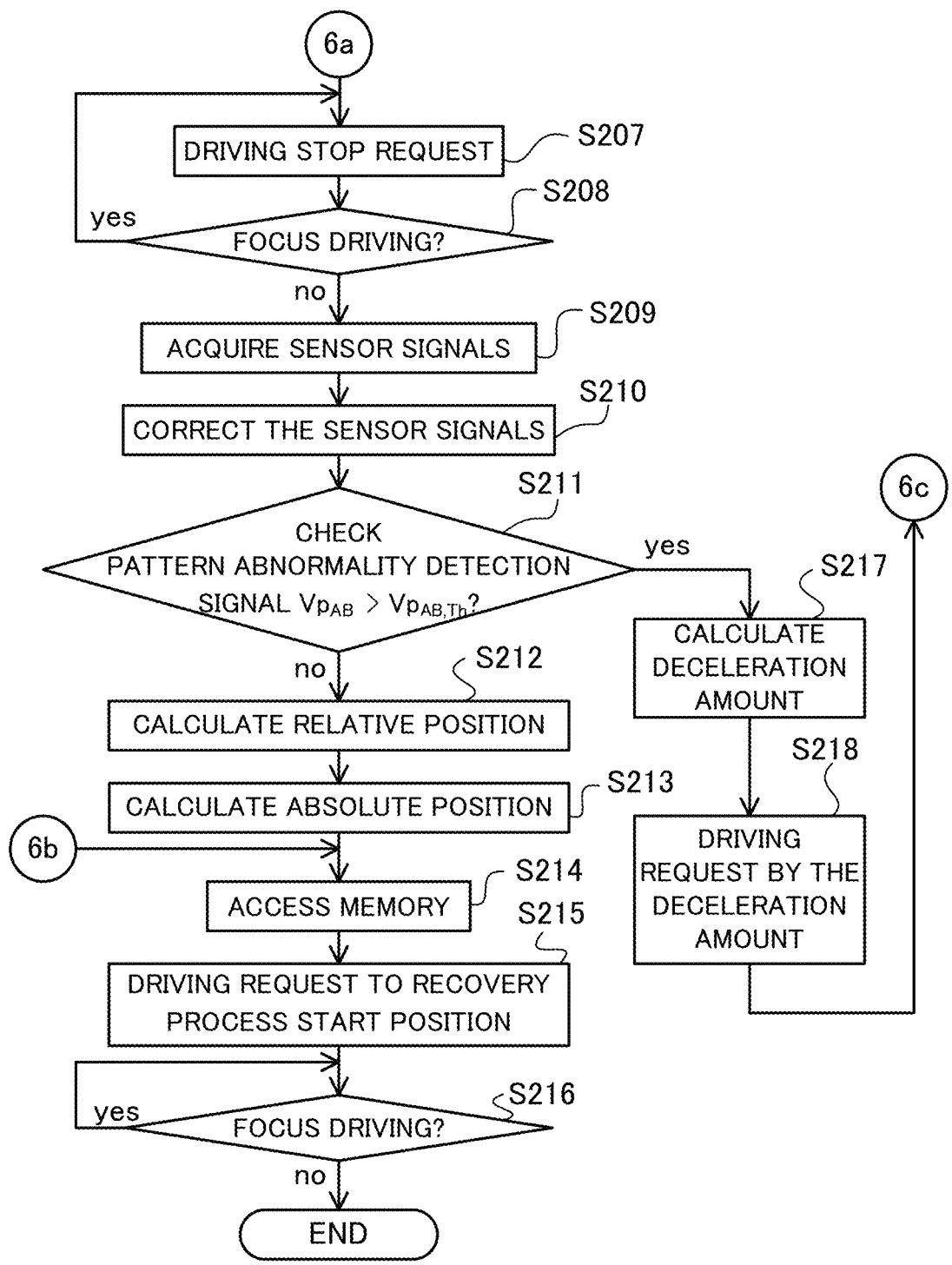

Referring now to FIGS. 6A and 6B, a detailed description of the absolute position resetting operation in the step S200 as the subroutine. Reference numerals 6a, 6b, and 6c in the flowchart in FIG. 6A are connected to reference numerals 6a, 6b, and 6c in FIG. 6B.

The absolute position resetting operation in this embodiment continuously drives the focus lens 102 in the predetermined direction, and searches the scale 105 for the position at which the precision of the absolute position can be guaranteed. When the absolute position with the guaranteed precision cannot be found even when the focus lens 102 is moved by the predetermined amount, the focus controller 108 drives the focus lens 102 to the end position in the movable range in accordance with the signal from the focus position detection controller 117. This movement enables the focus position detection controller 117 to set as the absolute position and the reference position, the design value of the end position stored in the position detection memory 116 even when the absolute position detection signal is unstable. After the absolute position is set, the focus controller 108 drives the focus driving lens motor 103 to the position of the focus lens 102 when the step S200 starts. The step S200 includes the steps S201 to S226. A more specific description will now be given of these steps S201 to S226.

In the step S201, the focus position detection controller 117 performs an initialization process for the recovery process. The initialization process is broadly divided into three processes.

In the first process, the focus position detection controller 117 clears and zeros a recovery driving amount as a driving amount by which the focus lens 102 is driven in the recovery process. In this embodiment, the focus lens position detection controller 117 sets the absolute position at the end position in the movable range of the focus lens 102 when the recovery driving amount exceeds the predetermined amount. This embodiment determines, based on the driving amount, whether or not the absolute position is to be set at the end position, but the determination may be based on the driving time period of the focus lens 102.

In the second process, the focus position detection controller 117 stores the driving amount from the position of the focus lens 102 when the recovery process starts in the position detection memory 116, so as to return the focus lens 102 to its position when the step S201 starts after the absolute position is set. More specifically, the driving amount in the recovery process is stored by calculating a relative position detection signal by the relative position calculator 113 for each predetermined cycle, and by accumulating the moving amount.

In the third process, the focus position detection controller 117 sets the driving direction of the focus lens 102 to the side or the image sensor 203 or the unillustrated object. In this embodiment, the focus position detection controller 117 generally sets the driving direction to the object side, but can change the driving direction to be set according to the situation. For example, when the focus lens 102 located at the end position in the movable range is likely to collide and get damaged with another member, the focus position detection controller 117 may set the driving direction to a direction in which a driving allowance amount to the end position is larger. In order to detect the end position at an earlier timing, the focus position detection controller 117 may set the driving direction to a direction in which a driving allowance amount to the end position is smaller. In order to roughly recognize the current position of the focus lens 102, the focus position detection controller 117 may set the driving direction based on the output value of the ATAN signal PTN2 after the sensor signals are acquired from the patterns 2 and 2*. In this case, for example, when the output value of the ATAN signal PTN2 is equal to or higher than the predetermined value, the driving direction is set to the object side, and when the output value of the ATAN signal PTN2 is lower than the predetermined value, the driving direction is set to the side of the image sensor 203.

After the step S201 is processed, the focus position detection controller 117 allows the focus driving motor 103 to provide recovery operation driving, and the procedure moves to the step S202.

In the step S202, the focus position detection controller 117 determines whether the recovery driving amount exceeds a predetermined amount $Drive_{th}$. The focus position detection controller 117 determines based on this determination whether or not driving for detecting the end position of the focus lens 102 is to be performed. When it is determined that the recovery driving amount has exceeded the predetermined amount, the procedure moves to the step S225, and when it is determined that the recovery driving amount has not yet exceeded the predetermined amount, the procedure moves to the step S203.

In the step S203, the focus position detection controller 117 determines whether or not the focus lens 102 is being driven. The driving status is determined by determining whether the focus controller 108 is outputting a driving signal to the focus driving circuit 106. When the focus position detection controller 117 determines that the focus lens 102 is being driven, the procedure moves to the step S204, and when the focus position detection controller 117 determines that the focus lens 102 is not being driven, a signal is sent so as to instruct the focus driving motor 103 to drive the focus lens 102 and the determination is again performed in the step S203 until the driving starts. In this embodiment, the focus position detection controller 117 searches for an absolute position having a guaranteed precision during the driving, but may determine whether the precision is guaranteed at a stop position after micro driving for improved precision.

In the step S204, the focus position detection controller 117 acquires sensor signals through the sensor signal acquirer 110. The sensor signals to be acquired herein are eight sensor signals 1a, 1b, 1a*, 1b*, Exa, Exb, Exa*, and Exb*. The sensor signals 1a, 1b, 1a*, and 1b* are acquired so as to calculate the relative moving amount based on the relative position detection signal by the relative position calculator 113. Thereby, the accumulation of the recovery driving amount and the position information (position moving amount) for the feedback control of the focus driving motor 103 can be output to the focus controller 108. After the step S204 ends, the procedure moves to the step S205.

In the step S205, the focus position detector controller 117 makes the sensor signal corrector 111 correct the sensor signals acquired in the step S204. After the step S205 ends, the procedure moves to the step S206.

In the step S206, the focus position detection controller 117 makes the position precision determiner 115 determine whether or not the pattern on the scale 105 is abnormal, using the abnormality detection signals. Similar to the step S105, the position precision determiner 115 compares the deviation voltage Vp with the deviation voltage threshold $Vp_{Ex,Th}$. The position precision determiner 115 considers the pattern to be abnormal when the deviation voltage Vp exceeds the deviation voltage threshold $Vp_{Ex,Th}$, and the position precision determiner 115 considers the pattern to be normal when the deviation voltage Vp is equal to or lower than the deviation voltage threshold $Vp_{Ex,Th}$. When it is determined that the pattern is abnormal, the procedure moves to the step S219, and when it is determined that the pattern is normal, the procedure moves to the step S207. When it is determined that the pattern is normal, the focus position detection controller 117 temporarily stores the relative position in the determination in the position detection memory 116.

When the pattern on the scale 105 is determined normal in the step S206, the focus position detection controller 117 outputs a driving stop request of the focus driving motor 103 to the focus controller 108 in the step S207. After the step S207 ends, the procedure moves to the step S208.

In the step S208, the focus position detection controller 117 determines whether the focus driving motor 103 stops driving. Similar to the step S203, whether or not the focus driving motor 103 stops driving is determined based on whether or not the focus controller 108 is outputting the driving signal to the focus driving circuit 106. The focus position detection controller 117 moves to the step S209 when it is determined that driving has been stopped, and repeats the determination in the step S208 until the focus driving motor 103 stops driving when it is determined that driving has not yet been stopped.

In the step S209, the focus position detection controller 117 makes the sensor signal acquirer 110 acquire the sensor signals. The sensor signals to be acquired are similar to those in the step S204. After the step S209 ends, the process moves to the step S210.

In the step S210, the focus position detection controller 117 makes the sensor signal corrector 111 correct the sensor signals acquired in the step S209. After the step S210 ends, the procedure moves to the step S211.

In the step S211, the focus position detection controller 117 makes the position precision determiner 115 again determines whether or not the pattern on the scale 105 is abnormal, using the abnormality detection signals. This is because the position of the focus lens 102 at which it is determined that the pattern is normal in the step S206 is different from the actual stop position of the focus lens 102. When it is determined that the pattern is abnormal in the step S211, the procedure moves to the step S217, and when it is determined that the pattern is normal, the procedure moves to the step S218.

In the step S212, the relative position calculator 113 calculates the relative position. The relative position detection signal is calculated using the sensor signals acquired in the step S209. Since the relative position can be regarded as the reference position in the startup, the relative position is set in the absolute position calculation in the next step S213. In calculating the next relative moving amount, the focus position detection controller 117 stores the output value of the ATAN signal 1 as the relative position detection signal in the step S212, in the position detection memory 116. The focus position detection controller 117 calculates a current relative position to the provisional reference position determined in the step S201 so as to return the focus lens 102 to the position when the recovery process starts in the step S215. The moving amount is stored as the initial position returning drive amount in the position detection memory 116. After the step S212 ends, the procedure moves to the step S213.

In the step S213, the absolute position calculator 112 calculates the absolute position. The light receiving arrays are changed to the patterns 2 and 2\*, and the sensor signal acquirer 110 acquires the sensor signals 2a, 2b, 2a\*, and 2b\* after the light receiving characteristic becomes stable. The sensor signal corrector 111 corrects the acquired sensor signals, and the absolute position calculator 112 calculates the absolute position detection signal using the sensor signals of the patterns 1 and 1\* corrected in the step S210. The absolute position calculator 112 corrects an error amount in the absolute position detection signal caused by the sensor attachment error etc. for the design value, and calculates the absolute position. After the step S213 ends, the procedure moves to the step S214.

In the step S214, the focus position detection controller 117 accesses the position detection memory 116. Since the more specific process is similar to the step S110, a description thereof will be omitted. Next, the procedure moves to the step S215.

In the step S215, the focus position detection controller 117 outputs a driving request of a predetermined driving amount to the focus controller 108 so as to return the focus lens 102 to its position when the recovery process starts. The predetermined driving amount is a distance to the position when the recover process starts stored in the step S201, and an initial position returning driving amount stored in the position detection memory 116 in the step S212. After the step S215 ends, the procedure moves to the step S216.

In the step S216, the focus position detection controller 117 determines whether or not driving in response to the driving request output in the step S215 ends. The driving status is determined based on whether or not the focus controller 108 is outputting the driving signal to the focus driving circuit 106. The focus position detection controller 117 ends the procedure in the step S200 when determining that driving has ended, and performs the determination in the step S216 until driving of the focus driving motor 103 ends when determining that driving has not yet ended.

In the step S217, the focus position detection controller 117 calculates a deceleration driving amount based on the relative moving amount calculated in the relative position calculator 113 until it is determined in the step S208 that driving has stopped after the driving stop request is output in the step S207. The process in the step S217 is performed when the abnormality is again detected in the step S211 although the abnormal pattern on the scale 105 is not detected in the step S206. In other words, in order to return the focus lens 102 to its position in the step S206 at which the pattern abnormality is not detected, a deceleration driving amount is calculated for a period from when the stop request of the focus driving motor 103 is output to when the focus lens 102 is actually stopped. The focus position detection controller 117 rewrites the recovery driving amount to the calculated deceleration driving amount from which the predetermined amount drive$_{th}$ is calculated. This process attempts to prevent the driving by the deceleration driving amount from being changed to the end contact driving, and to determine that the abnormality detection system does not normally work when the pattern abnormality detection result is different although the focus lens 102 is located at the same position. The present invention is not limited to this embodiment. After the step S217 ends, the procedure moves to the step S218.

When the determination is recursively performed in the determination block that includes the step S211, the sensor signals are obtained for each time, and a variety of operations related to the position information are performed. This is not limited to the process illustrated in FIGS. 6A and 6B, and is similarly applicable to another process.

In the step S218, the focus position detection controller 117 outputs the driving request of the deceleration driving amount calculated in the step S217, to the focus controller 108. After the step S218 ends, the procedure returns to the step S202, which again determines the pattern abnormality in and after the driving.

The process from the step S220 to the step S224 is a process performed when the position of the focus lens 102 at which the absolute position can be guaranteed cannot be detected even after the focus lens 102 is driven by the predetermined amount, or when the focus lens 102 reaches the end position in its movable range during the driving by the predetermined amount. This process detects the end position, and sets the absolute position with the design value of the end position irrespective of the determination result of the abnormality detector 114.

In the step S219, the focus position detection controller 117 determines whether the focus lens 102 reaches the end position in the movable range. More specifically, the focus position detection controller 117 determines whether a change has been removed in the sensor signals obtained from the position detection sensor 104, except for the signals from the patterns Ex and Ex*, while the focus driving motor 103 is being driven.

Since the sensor signal contains noises, it is determined whether a predetermined changing amount has disappeared, and the predetermined changing amount is determined based on the driving velocity of the focus driving motor 103 in the recovery driving. While this embodiment uses the sensor signals from the position detection sensor 104 to determine whether the focus lens 102 reaches the end position, but may use a detector configured to separately detect the end position, such as a leaf switch. When it is determined that the focus lens 102 reaches the end position in the step S219, the procedure moves to the step S220, and when it is determined that the focus lens does not reach the end position, the procedure moves to the step S202.

In the step S220, the focus position detection controller 117 outputs a driving stop request of the focus driving motor 103 to the focus controller 108. After the step S220 ends, the procedure moves to the step S221.

In the step S221, the focus position detection controller 117 determines whether the focus driving motor 103 stops driving. Whether the focus driving motor 103 stops driving is determined based on whether the focus controller 108 is outputting the driving signal to the focus driving circuit 106, similar to the step S203. The focus position detection controller 117 moves to the step S222 when determining that driving has been stopped, and again performs the determination in the step S221 until the focus driving motor 103 stops driving when determining that driving has not yet been stopped.

In the step S222, the focus position detection controller 117 accesses the position detection memory 116, and acquires the absolute position of the focus lens 102 that is the design value of the end position. Whether the end position is closer to the image sensor 203 or the object is determined based on the driving signal output to the focus driving circuit 106 and the phase relationship of any one of the sensor signals. After the step S222 ends, the procedure moves to the step S223.

In the step S223, the relative position calculator 113 sets the relative position by setting the reference position to the absolute position that is the design value of the end position acquired in the step S222 and by calculating the output value of the relative position detection signal based on the sensor signals 1a and 1b at the current position. Similar to the step S212, the focus position detection controller 117 calculates the current relative position relative to the provisional reference position obtained in the step S201, and stores that moving amount as the initial position returning driving amount in the position detection memory 116. After the step S223 ends, the procedure moves to the step S224.

In the step S224, the absolute position calculator 112 sets the absolute position, without performing the calculation process, by setting the absolute position as the design value of the end position acquired in the step S222 to the output value of the absolute position calculator 112. After the step S224 ends, the procedure moves to the step S214.

When the recovery driving amount exceeds the predetermined amount $Drive_{th}$ in the step S202, the focus position detection controller 117 outputs the driving request used to change the current driving to the end contact driving to the focus controller 108 in the step S225. In the end contact driving, a driving amount of the focus lens 102 is set to a value larger than a normal stroke. At this time, the driving direction is the current driving direction or changed to a preset driving direction. In order to reduce an impulsive force caused by the collision with the member in the end contact, the driving velocity is changed to a low velocity. This embodiment may limit an applied power so as to provide a low driving torque. After the step S225 ends, the procedure moves to the step S226.

In the step S226, the focus position detection controller 117 determines whether the focus lens 102 has reached the end position in the movable range. The determination method is similar to the step S219. When it is determined that focus lens 102 has reached the end position in the step S226, the procedure moves to the step S220, and when it is determined that focus lens 102 has not yet reached the end position in the step S226, the step S226 is repeated until it reaches the end position.

As described above, this embodiment can calculate the absolute position with the guaranteed precision of the focus lens 102 in the startup. When the precision of the startup absolute position cannot be guaranteed by the absolute position detection apparatus, the position detection apparatus can maintain the precision by driving the focus lens 102 so as to set the reference position by the relative position detection apparatus, etc.

Referring now to flowcharts illustrated FIGS. 7A and 7B, a description will be given of a process flow of the position detection apparatus after the startup operation. After the startup operation, both the absolute position and the relative position are calculated for each predetermined period, and the absolute position is output when the precision of the absolute position is equal to or higher than the predetermined level, and the relative position is output when the precision of the absolute position is lower than the predetermined level.

In the step S301, the focus position detection controller 117 changes the patterns for the light receiving arrays in the position detection sensor 104 so as to receive light from the patterns Ex and Ex*. After the step S301 ends, the procedure moves to the step S302. The focus position detection controller 117 starts counting the elapsed time after the patterns are changed.

In the step S302, the focus position detection controller 117 determines whether or not the standby time period for stabilizing the light receiving characteristic (output) has elapsed after the light received patterns are changed for the position detection sensor 104. The elapsed time is monitored by counting the time in the focus position detection controller 117. Thereby, the focus position detection controller 117 stops and clears the time count and moves to the step S303 when determining that the predetermined time period has elapsed, and waits for a predetermined time period and then again performs the determination process in the step S302 when determining that the predetermined time period has not yet elapsed.

In the step S303, the focus position detection controller 117 makes the sensor signal acquirer 110 acquire the sensor signals as the abnormality detection signals from the patterns Ex and Ex*. The two-phase sensor signals Exa and Exb are acquired from the pattern Ex formed on the main track 105a, and the two-phase sensor signals Exa* and Exb* are acquired from the pattern Ex* formed on the main track 105b. After the step S303 ends, the procedure moves to the step S304.

In the step S304, the focus position detection controller 117 changes the patterns Ex and Ex* to the patterns 1 and 1* for the light receiving arrays in the position detection sensor 104. After the step S304 ends, the procedure moves to the step S305. The focus position detection controller 117 starts counting the elapsed time after the patterns are changed. In order to implement the other process before the light receiving characteristic (output) becomes stable, the patterns for the light receiving arrays may be changed just after the signals are acquired as in the flowcharts illustrated in FIGS. 7A and 7B. Reference numeral 7a in the flowchart illustrated in FIG. 7A is connected to the reference numeral 7a illustrated in FIG. 7B.

In the step S305, the focus position detection controller 117 makes the sensor signal corrector 111 correct the abnormality detection signals (sensor signals Exa, Exb, Exa*, and Exb*). The correction process of the abnormality detection signals eliminates only the harmonic component. After the step S305 ends, the procedure moves to the step S306.

In the step S306, the focus position detection controller 117 makes the position precision determiner 115 determine whether or not the pattern on the scale 105 is abnormal, using the abnormality detection signals from the abnormality detector 114. More specifically, the focus position detection controller 117 calculates the deviation voltage Vp relative to the offset voltage of the premeasured abnormality detection signal through the abnormality detector 114, and compares the deviation voltage Vp with the deviation voltage threshold $Vp_{Ex,Th}$ used to determine the pattern abnormality through the position precision determiner 115. The position precision determiner 115 determines that it is abnormal when the deviation voltage Vp exceeds the deviation voltage threshold $Vp_{Ex,Th}$, and that it is normal when the deviation voltage Vp is equal to or lower than the deviation voltage threshold $Vp_{Ex,Th}$. When the pattern is abnormal, the procedure moves to the step S308, and when the pattern is normal, the procedure moves to the step S307.

When the pattern on the scale 105 is determined normal at the current position, the focus position detection controller 117 clears and zeros the pattern abnormality detection flags $Err_{Ex}$ and $Err_{Ex*}$ in the step S307. After the step S307 ends, the procedure moves to the step S309.

When the pattern on the scale 105 at the current position is determined abnormal, the focus position detection controller 117 sets the pattern abnormality detection flags $Err_{ex}$ and $Err_{ex*}$ in the step S308. When $Vp_{Ex}>Vp_{Ex,Th}$, $Err_{EX}$ is set to 1, and when $Vp_{Ex*}>Vp_{Ex*,Th}$, $Err_{ex*}$ is set to 1. In other words, the flag is set for each corresponding pattern, and the flag for the track in which the pattern abnormality is not detected is cleared and zeroed. After the step S308 ends, the procedure moves to the step S309.

In the step S309, the focus position detection controller 117 determines whether or not the standby time period for stabilizing the light receiving characteristic (output) has elapsed after the light received patterns are changed for the position detection sensor 104 in the steps S304. The focus position detection controller 117 stops and clears the time count and moves to the step S310 when determining that the predetermined time period has elapsed, and waits for a predetermined time period and then again performs the determination process in the step S309 when determining that the predetermined time period has not yet elapsed.

In the step S310, the focus position detection controller 117 makes the sensor signal acquirer 110 acquire the sensor signals from the patterns 1 and 1*. The two-phase sensor signals 1a and 1b are acquired from the pattern 1 formed on the main track 105a, and the two-phase sensor signals 1a* and 1b* are acquired from the pattern 1* formed on the main track 105b. After the step S310 ends, the procedure moves to the step S311.

In the step S311, the focus position detection controller 117 changes the patterns 1 and 1* to the patterns 2 and 2* for the light receiving arrays in the position detection sensor 104. After the step S311 ends, the procedure moves to the step S312. The focus position detection controller 117 starts counting the time after the patterns are changed.

In the step S312, the focus position detection controller 117 makes the sensor signal corrector 111 correct the abnormality detection signals (sensor signals 1a, 1b, 1a*, and 1b*). The correction process of the abnormality detection signals eliminates the harmonic component, and adjusts the phase difference between the two-phase signals, amplitude amounts, and the offset displacement. After the step S312 ends, the procedure moves to the step S400 as the subroutine.

In the step S400, the focus position detection controller 117 makes the relative position calculator 113 calculate the relative position at the current position of the focus lens 102. Initially, the relative position calculator 113 performs an arc tangent conversion for the sensor signals 1a and 1b that have been corrected in the step S312, and calculates the ATAN signal 1 as the relative position detection signal. Next, the relative position calculator 113 accesses the position detection memory 116, acquires the relative position and the relative position detection signal at the last cycle, and calculates the difference value between the last and present relative position detection signals. The relative position calculator 113 calculates a difference by considering any shifts between the sawtooth wave peaks in the last and present ATAN signals. The relative position at the current position is calculated by adding the difference result to the last relative position. After the step S400 ends, the procedure moves to the step S313.

In the step S313, the focus position detection controller 117 determines whether or not the standby time period has elapsed for stabilizing the light receiving characteristic (output) after the light received patterns are changed for the position detection sensor 104 in the step S311. The focus position detection controller 117 stops and clears the time count and moves to the step S314 when determining that the predetermined time period has elapsed, and waits for a predetermined time period and then again performs the determination process in the step S313 when determining that the predetermined time period has not yet elapsed.

In the step S314, the focus position detection controller 117 makes the sensor signal acquirer 110 acquire the sensor signals from the patterns 2 and 2*. The two-phase sensor signals 2a and 2b are acquired from the pattern 2 formed on the main track 105a, and the two-phase sensor signals 2a* and 2b* are acquired from the pattern 2* formed on the main track 105b. After the step S314 ends, the procedure moves to the step S315.

In the step S315, the focus position detection controller 117 changes the patterns 2 and 2* to the patterns Ex and Ex* for the light receiving arrays in the position detection sensor 104. After the step S315 ends, the procedure moves to the step S316. The focus position detection controller 117 starts counting the time after the patterns are changed.

In the step S316, the focus position detection controller 117 makes the sensor signal corrector 111 correct the abnormality detection signals (sensor signals 2a, 2b, 2a*, and 2b*). The correction process of the abnormality detection signals eliminates the harmonic component, and adjusts the phase difference between the two-phase signals, amplitude amounts, and the offset displacement. After the step S316 ends, the procedure moves to the step S500 as the subroutine.

In the step S500, the focus position detection controller 117 makes the absolute position calculator 112 calculate the absolute position at the current position of the focus lens 102. Initially, the absolute position calculator 112 performs an arc tangent conversion for the sensor signals that have been corrected in the steps S312 and S316, and calculates the absolute position detection signal through the signal processing illustrated in FIG. 3. Next, the absolute position calculator 112 corrects an error in the absolute position detection signal from the design value caused by the sensor attachment error, and acquires the absolute position at the current position of the focus lens 102. After the step S500 ends, the procedure moves to the step S317.

In the step S317, the focus position detection controller 117 determines the pattern abnormality detection flags $Err_{EX}$ and $Err_{Ex*}$. When one of the flags is set to 1, the focus position detection controller 117 determines that the abnormal pattern is detected at the current position of the focus lens 102, and moves to the step S326. When none of the flags is set to 1, the focus position detection controller 117 determines that the abnormal pattern is not detected at the current position of the focus lens 102, and moves to the step S318.

In the step S318, the focus position detection controller 117 makes the position precision determiner 115 check the difference value between the absolute position moving amount ΔABS and the relative position moving amount ΔREL in a predetermined time period. The position precision determiner 115 determines that the absolute position is not normally calculated when the absolute value of the difference value exceeds a threshold $\Delta Diff_{Th}$, and moves to the step S325. The position precision determiner 115 determines that the absolute position is normally calculated when the absolute value of the difference value is equal to or lower than the threshold $\Delta Diff_{Th}$ and moves to the step S319. When the abnormal pattern is detected in the last determination, the last absolute position is not fixed and the focus position detection controller 117 moves to the step S325 without implementing the current determination by the position precision determiner 115.

In the step S319, the focus position detection controller 117 clears and zeros the absolute position calculation abnormal flag $Err_{Diff}$ by the check of the differential value between ΔABS and ΔREL. The absolute position calculation abnormal flag $Err_{Diff}$ of 0 means that the position precision determiner 115 guarantees the precision of the absolute position calculated by the absolute position calculator 112 and in this case the absolute position is allowed to output as the position information. After the step S319 ends, the procedure moves to the step S320.

In the step S320, the focus position detection controller 117 calculates a difference between the position REL and the absolute position ABS of the focus lens 102 calculated in the steps S400 and S500, and compares the difference with the threshold $Dev_{Th}$. The focus position detection controller 117 moves to the step S323 when determining that |ABS−REL| exceeds the threshold $Dev_{Th}$, and moves to the step S321 when determining that |ABS−REL| is equal to or lower than the threshold $Dev_{Th}$.

Unlike this embodiment that uses the same sensor and scale to detect the absolute position and the relative position, when separate sensors and scales are used, the calculation results of the absolute position and the relative position are likely to have a deviation (or difference) due to the component attachment precision etc. The configuration of this embodiment may cause a slight deviation (or difference) due to different calculation steps between the absolute position and the relative position. The deviation causes the position to be discontinuously detected when the output position information is changed from the relative position to the absolute position or vice versa. Accordingly, the feedback control of the focus driving motor 103 and a variety of controls may become unstable. Since this deviation is accumulated, it is necessary to eliminate the difference if necessary, or it is necessary to correct the relative position (or to reset the reference position).

Accordingly, the focus position detection controller 117 determines the deviation amount in the step S320. In this embodiment, the absolute position calculated by the absolute position calculator 112 has a precision guaranteed by the position precision determiner 115 in the step S318. Hence, when the deviation amount exceeds the threshold $Dev_{Th}$, the absolute position may be corrected based on the structure, application, and the relative position, rather than the steps S323 and S324, which will be described later.

In the step S321, the focus position detection controller 117 accesses the position detection memory 116. More specifically, the position detection memory 116 stores the absolute position calculated by the absolute position calculator 112, the relative position calculated by the relative position calculator 113, the relative position detection signal, the pattern abnormality detection flags $Err_{EX}$ and $Err_{Ex*}$, and the absolute position calculation abnormality flag $Err_{Diff}$. After the step S321 ends, the procedure moves to the step S322.

In the step S322, the focus position detection controller 117 outputs as the position information the absolute position calculated by the absolute position calculator 112 to the focus controller 108. Due to this process, the position of the focus lens 102 is detected and calculated, and a sequence for outputting the position information with the guaranteed precision ends. The focus position detector 107 repeats this sequence at a cycle of a predetermined time period as long as the interchangeable lens 100 is being electrified.

When it is determined that the deviation amount exceeds the threshold $Dev_{Th}$ in the step S318, the focus position detection controller 117 resets the reference position in the step S323. More specifically, the focus position detection controller 117 sets the absolute position ABS calculated in the step S500 to the reference position. After the step S323 ends, the procedure moves to the step S324.

In the step S324, the focus position detection controller 117 resets the relative position REL of the focus lens 102 calculated by the step S400. More specifically, the focus position detection controller 117 updates the reference position set in the step S323 with the relative position REL. The relative position detection signal is maintained to be a value calculated in the step S400 without any changes. After the step S324 ends, the procedure moves to the step S321.

In the step S325, the focus position detection controller 117 sets the absolute position calculation abnormality flag $Err_{Diff}$ to 1 based on the difference value between ΔABS and ΔREL by the position precision determiner 115 determined in the step S318. The absolute position calculated by the absolute position calculator 112 is so inaccurate that it is prohibited from being output as the position information. After the step S325 ends, the procedure moves to the step S326.

In the step S326, the focus position detection controller 117 accesses the position detection memory 116. More specifically, the position detection memory 116 stores the absolute position calculated by the absolute position calculator 112, the relative position calculated by the relative position calculator 113, the relative position detection signal, the pattern abnormality detection flags $Err_{EX}$ and $Err_{Ex*}$, and the absolute position calculation abnormality flag $Err_{Diff}$. After the step S326 ends, the procedure moves to the step S327.

In the step S327, the focus position detection controller 117 outputs as the position information the relative position calculated by the relative position calculator 113, to the focus controller 108. Due to this process, the position of the focus lens 102 is detected and calculated, and a sequence for outputting the position information with the guaranteed precision ends. The focus position detector 107 repeats this sequence at a cycle of a predetermined time period as long as the interchangeable lens 100 is being electrified.

The above procedure can provide appropriate position information in the position detection after the startup operation, even when the precision detected by the absolute position detection apparatus deteriorates.

Figure 7A:
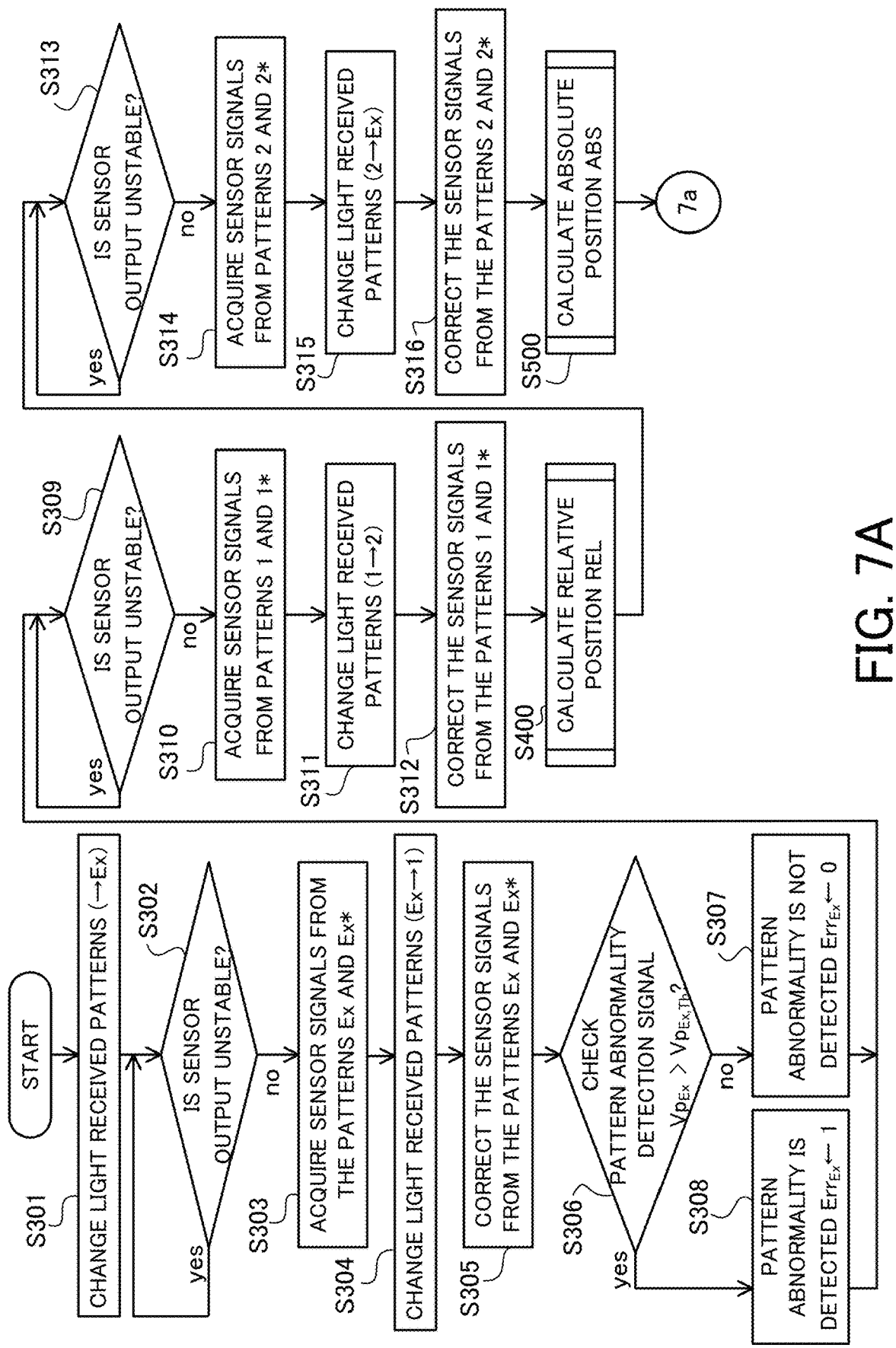
FIGS. 7A and 7B are flowcharts of a post-startup process for the position detection apparatus according to the first embodiment.
Figure 7B:
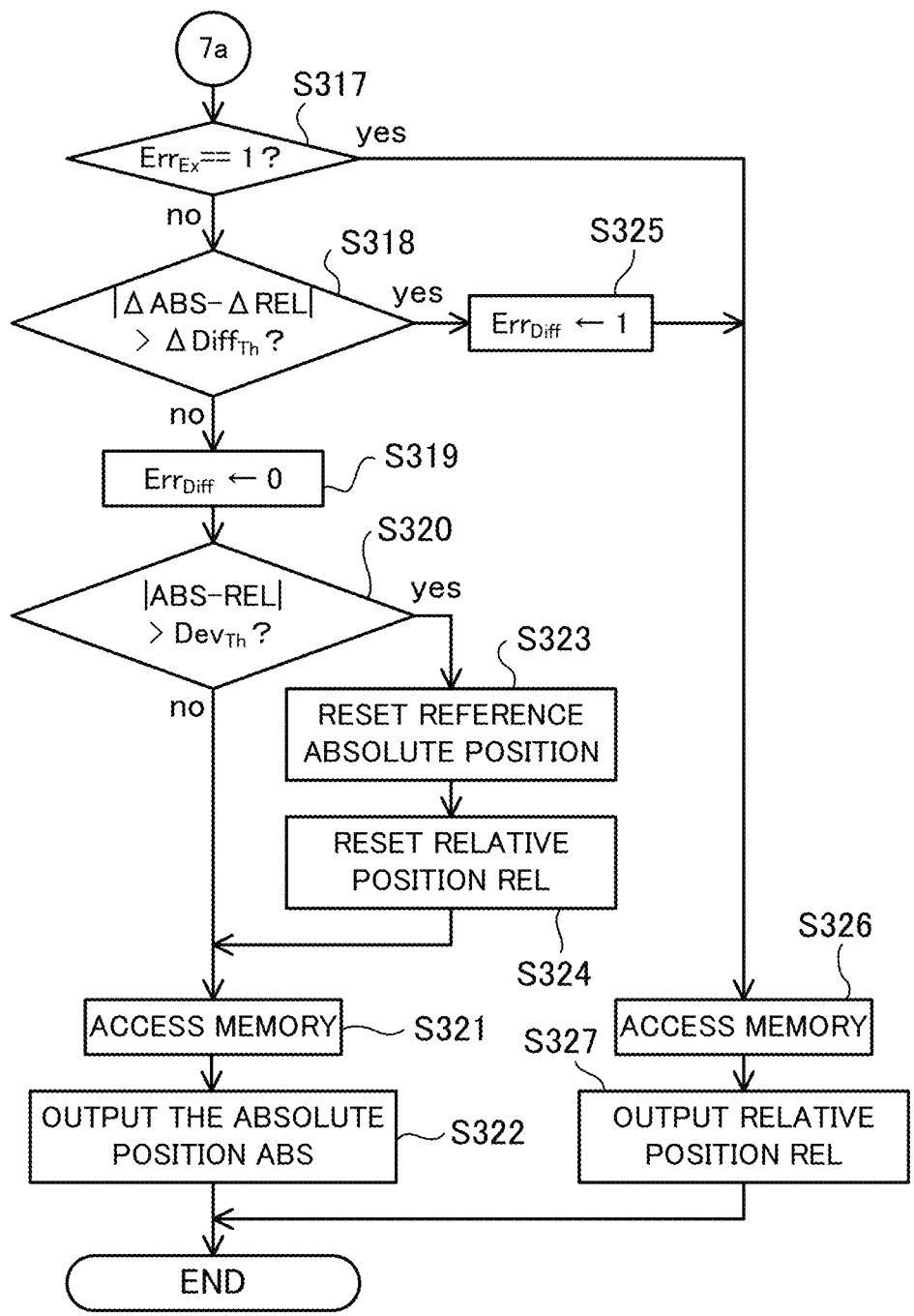
Figure 8:
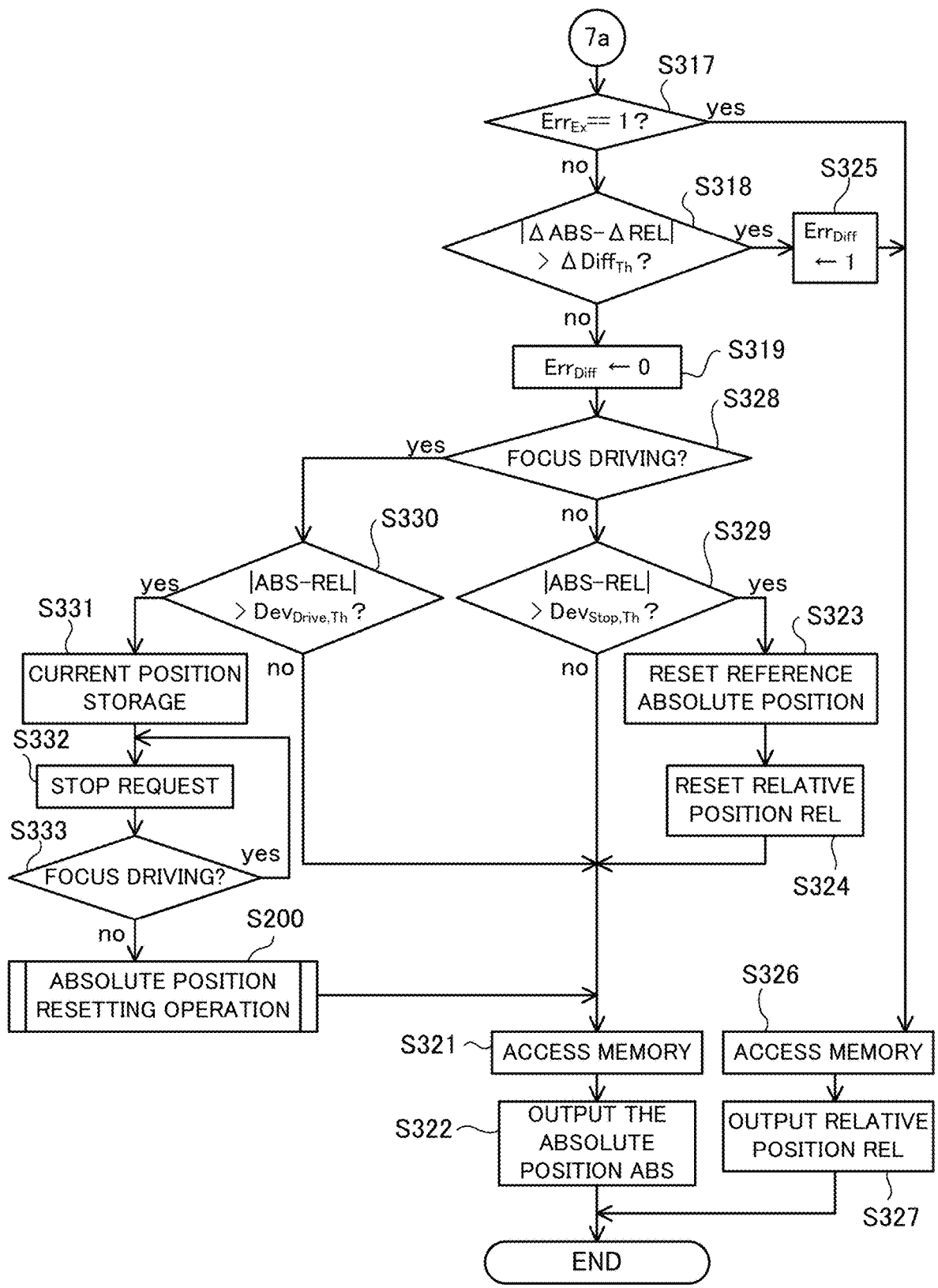
FIG. 8 is a flowchart of the post-startup process for the position detection apparatus in which a driving state of a focus lens is considered according to the first embodiment.

The condition in the determination of the difference value between the absolute position ABS and the relative position REL illustrated in FIGS. 7A and 7B can be fractionated based on whether or not the focus driving motor 103 is being driven. One example will be described with reference to FIG. 8. A flowchart illustrated in FIG. 8 illustrates a process flow after the startup operation of the position detection apparatus similar to FIGS. 7A and 7B. Those steps which are corresponding steps in FIGS. 7A and 7B will be designated by the same step numbers, and a description thereof will be omitted. Reference numeral 7a in FIG. 8 is connected to reference numeral 7a in FIG. 7A. In other words, the flow from the step S301 to the step S500 is the same as that described with reference to FIG. 7A.

The flowchart in FIG. 8 uses two types of values $Dev_{Drive,Th}$ and $Dev_{Stop,Th}$ as thresholds used to determine the deviation amount between the absolute position ABS and the relative position REL depending on whether or not the focus driving motor 103 stops.

As described above, in the configuration used to calculate the absolute position according to this embodiment, a standby time period occurs after the patterns are changed for the light receiving element arrays in the position detection sensor 104. Hence, the absolute position shifts from the relative position according to a driving velocity of the focus driving motor 103. Accordingly, in the procedure illustrated in FIG. 8, a large value that is made by considering the absolute position shifted due to driving in the pattern change is set to a threshold $Dev_{Drive,Th}$ while the focus driving motor 103 is being driven, and a smaller value is set to the threshold $Dev_{Stop,Th}$ while the focus driving motor 103 stops. For example, when a minimum detecting unit is 1 pulse, $Dev_{Stop,Th}$ is set to 2 pulses. Thereby, the deviation is prevented from accumulating while the focus driving motor 103 stops.

Even though the sensor signal corrector 111 and the absolute position calculator 112 made erroneous corrections or erroneous calculations, the deviation can be always detected when the focus driving motor 103 stops, and the deviation can be detected even when the focus driving motor 103 is being driven if the deviation exceeds the threshold that is made by considering the shift amount of the absolute position caused by driving in the pattern change. Thus, a shift can be accurately detected while the focus driving motor 103 is being driven by limiting the shift of the absolute position caused by driving in the pattern change (for example, by reducing a pattern change time period or by executing a precise velocity compensation that can handle a changing time period).

In the step S328, the focus position detection controller 117 determines whether or not the focus driving motor 103 is currently being driven. Due to this determination, which of the two types of deviation determination thresholds is to be used is determined. When the focus driving motor 103 is being driven, the procedure moves to the step S330, and when the focus driving motor 103 is not being driven, the procedure moves to the step S329. In this embodiment, whether the focus driving motor 103 is being driven is determined in the step S328. The determination may depend on the driving velocity. When the driving velocity is low, the shift influence of the absolute position with the pattern change is negligible.

In the step S329, the focus position detection controller 117 uses $Dev_{Stop,Th}$ for the deviation determination threshold. The deviation between the relative position REL of the focus lens 102 by the step S400 and the absolute position ABS of the focus lens 102 by the step S500 is checked with this threshold. When it is determined that |ABS−REL| exceeds a threshold $Dev_{Stop,Th}$, the procedure moves to the step S323, and when it is determined that |ABS−REL| is equal to or lower than the threshold $Dev_{Stop,Th}$, the procedure moves to the step S321.

In the step S330, the focus position detection controller 117 uses $Dev_{Drive,Th}$ for the deviation determination threshold. The deviation between the relative position REL of the focus lens 102 by the step S400 and the absolute position ABS of the focus lens 102 by the step S500 is determined with this threshold. When it is determined that |ABS−REL| exceeds a threshold $Dev_{Stop,Th}$, the procedure moves to the step S331, and when it is determined that |ABS−REL| is equal to or lower than the threshold $Dev_{Stop,Th}$, the procedure moves to the step S321.

In the step S331, the focus position detection controller 117 stores the current relative position detection signal in the position detection memory 116. Due to the step S331, the focus position detection controller 117 can calculate a moving amount of the focus lens 102 until the step S333 determines that the focus driving motor 103 stops, based on a change amount of the relative position detection signal obtained by the relative position calculator 113. This process is attempted to calculate the relative position based on the position stored in the step S331 when the precision of the absolute position is not guaranteed at the stop position. After the step S331 ends, the procedure moves to the step S332.

In the step S332, the focus position detection controller 117 outputs the driving stop request of the focus driving motor 103 to the focus controller 108. After the step S332 ends, the procedure moves to the step S333.

In the step S333, the focus position detection controller 117 determines whether or not the focus lens 102 stops. Whether or not the focus lens 102 stops is determined based on the sensor signals. When it is determined to stop in the step S333, the procedure moves to the absolute position resetting operation in the step S200 as the subroutine in order to detect the absolute position having the guaranteed precision. When it is not determined to stop, the procedure moves to the step S332.

In the step S200, the precision of the absolute position can be guaranteed at the position stored in the step S331. Hence, the driving direction and the driving amount are calculated back based on the relative position detection signal stored in the step S331, and used for the process in the subroutine. After the step S200 ends, the absolute position calculated by the absolute position calculator 112 has a guaranteed precision, or the relative position is also position information in which the reference position has a guaranteed precision. Therefore, both position precisions are guaranteed. After the step S200 ends, the procedure moves to the step S321.

Hence, as illustrated in FIG. 8, in determining whether the precision of the absolute position is higher than the predetermined level using the deviation between the absolute position and the relative position, more highly precise position information can be provided by changing the threshold according to whether the focus lens 102 is being driven. The threshold used to determine the difference value between the absolute position moving amount ΔABS and a relative position moving amount ΔREL in the predetermined time period in the step S318 may be similarly changed according to whether the focus lens 102 is being driven.

Second Embodiment

Figure 9:
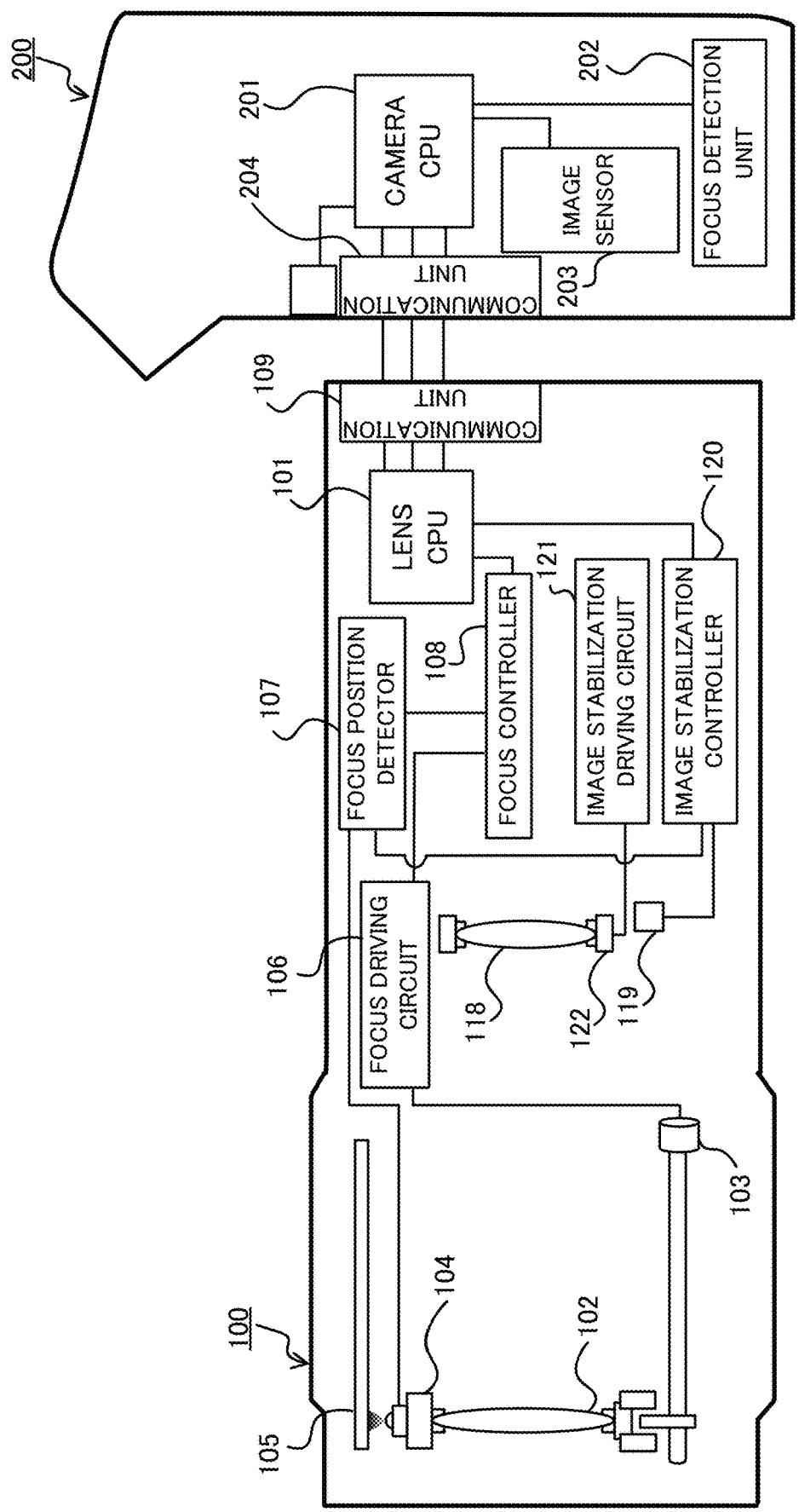
FIG. 9 is a block diagram of a camera system according to a second embodiment of the present invention.

FIG. 9 illustrates a configuration of a camera system that includes an interchangeable lens 100 mounted with the position detection apparatus according to the present invention, and a camera body 200 detachably attached to the interchangeable lens 100. A description of those elements which are corresponding elements in the first embodiment will be omitted.

The second embodiment is configured by adding an image stabilizing configuration for a photographer to the configuration of the first embodiment. An image stabilization lens 118 is an optical system configured to correct manual blurs applied by the photographer. An acceleration sensor 119 (vibration detector) can detect an inclination and an impact applied to the interchangeable lens 100 in three axes directions. An image stabilization controller 120 acquires an acceleration signal from the acceleration sensor 119, and calculates a moving amount of the image stabilization lens 118 so as to reduce object blurs based on the acquired signal. An image stabilization driving circuit 121 and an image stabilizing motor 122 drive the image stabilization lens 118.

In the second embodiment, the position precision determiner 115 configured to determine the precision of the calculated absolute position performs a determination control configured to predict the absolute position and to determine whether or not a determination using the difference value between the absolute position moving amount and the relative position moving amount is to be performed, in addition to the processes described in the first embodiment. This embodiment sequentially stores the absolute position calculated by the absolute position calculator 112 in the position detection memory 116. The absolute position is predicted based on the locus information of the past absolute positions. The determination control of the difference value is performed according to the magnitude of the external force applied to the position detection apparatus.

The magnitude of the external force is observed by the acceleration sensor 119. The image stabilization controller 120 acquires an acceleration signal detected by the acceleration sensor 119, calculates the magnitude of the vector in the optical axis direction to the external force, and outputs the calculated value to the focus position detector 107.

As described above, the external force applied to the focus lens 102 is observed by the acceleration sensor 119 provided in the interchangeable lens 100 in the second embodiment, but an external force detecting sensor peculiar to the focus lens 102 may be used. An external force detecting mechanism in the camera body 200, such as an acceleration detection, a vibration detection, and an angular velocity detection, may detect an external force, and a signal illustrating the detected external force may be output to the focus position detector 107 through a communication unit.

Figure 10:
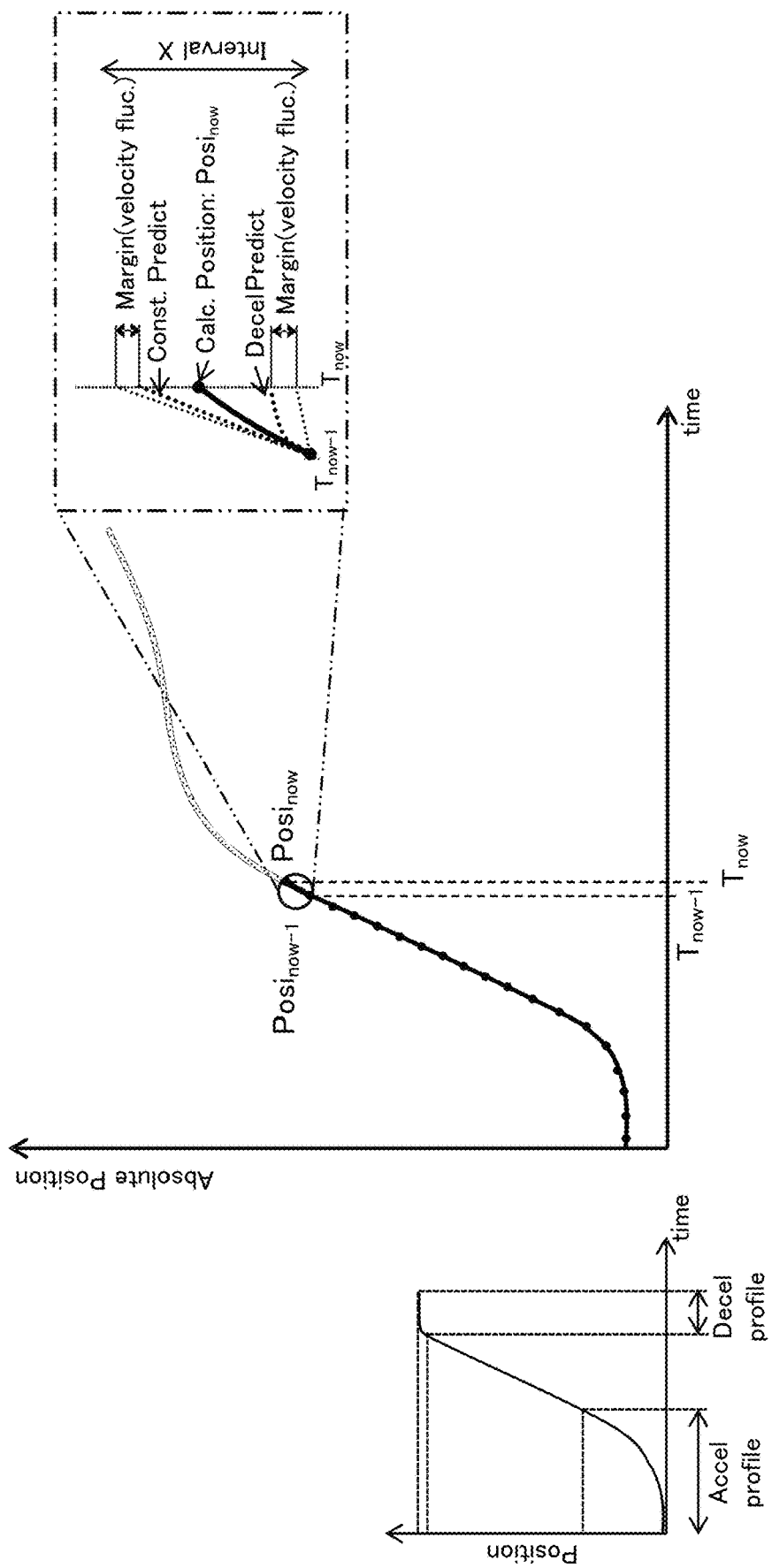
FIG. 10 is a view for explaining a prediction determination using time-series locus information of an absolute position according to a second embodiment.

Referring now to FIG. 10, a description will be given of a prediction of the absolute position based on the locus information of the absolute position history. In a graph in FIG. 10, an abscissa axis denotes time, and an ordinate axis denotes the position of the focus lens 102.

A left graph in FIG. 10 illustrates an acceleration/deceleration profile of the focus driving motor 103, and is classified into three intervals, i.e., an acceleration interval from a startup to a maximum velocity, a constant velocity interval in which the maximum velocity is maintained, and a deceleration interval from the maximum velocity to the stop. The right graph in FIG. 10 illustrates illustrative locus information of the absolute position. A plot on the graph is a locus of the absolute position calculated for each predetermined cycle. For simplified conditions, each plotted absolute position has a guaranteed precision. Where $Posi_{now}$ is an absolute position calculated at time $T_{now}$, a description will be given of determining whether or not the absolute position has a guaranteed precision.

Initially, the position precision determiner 115 estimates which interval in the acceleration/deceleration profile of the focus driving motor 103 the driving state at the time $T_{now}$ corresponds to, based on the (moving) locus of the absolute position up to the time $T_{now-1}$. Since the maximum velocity for driving the focus lens 102 is different according to the driving command, the interval cannot be estimated simply by measuring the velocity. Accordingly, the position precision determiner 115 checks whether the driving locus has no constant velocity interval.

When the driving locus has the constant velocity interval, the position precision determiner 115 makes the constant velocity interval in the acceleration/deceleration profile correspond to the driving locus. The driving state at the time $T_{now}$ is limited to the constant speed interval or the deceleration interval when the constant velocity interval continues up to the time $T_{now-1}$, and is limited to the deceleration interval when the constant velocity interval does not continue up to the time $T_{now-1}$.

When the driving locus has no constant velocity interval, the driving state at the time $T_{now}$ is limited to the acceleration interval or the constant velocity interval. In this case, the acceleration profile is divided into some areas and corresponding points with the driving locus are calculated by rotating, extending or reducing each area, and the driving state at the time $T_{now}$ can be led.

Since the time $T_{now-1}$ corresponds to the constant velocity state in FIG. 10, it can be estimated that the driving state at the time $T_{now}$ corresponds to the constant velocity interval or the deceleration interval. In FIG. 10, the figure enclosed by a long dashed double-short dashed line illustrates a locus at the time $T_{now}$ predicted from the absolute position $Posi_{now-1}$ at the time $T_{now-1}$ based on the acceleration/deceleration profile. A dotted line illustrates predicted loci (const.predict and decel.predict) for the driving states at the time $T_{now}$ that correspond to the constant velocity and the deceleration. Since the focus driving motor 103 receives a feedback control, the control caused velocity scattering is illustrated as a margin.

When the absolute position calculated at the time $T_{now}$ is located in the interval x in FIG. 10, the position precision determiner 115 determines that a calculation result falls within a prediction range of the driving locus, and the absolute position has a guaranteed precision.

While this embodiment describes a simple example, a reacceleration from the constant velocity interval is conceivable. In that case, the driving change process may be extracted from the focus controller 108. In the above description, the position precision determiner 115 estimates the acceleration/deceleration state, but this information may be obtained from the focus controller 108.

A description will now be given of a process for prohibiting the difference value between the absolute position moving amount and the relative position moving amount in the predetermined time period from being determined according to the magnitude of the external force applied to the position detection apparatus.

In general, as long as the actuator is electrified even when the focus lens stops, a holding torque is applied to a driven object. Thus, even when an external strong impact is applied, the focus lens 102 as an object to be driven does not usually move. However, an external force may exceed a holding torque due to the impact beyond expectation, such as a centrifugal motion and a drop from a high place, and a relative position detection system may not work in this case.

The relative position is detected based on a change amount of a repetitive signal at a predetermined cycle (relative position detection signal), and it is assumed that there is no change amount that does not exceed a predetermined interval in the position update cycle. Where the unexpected external force is applied, the assumption of the relative position detection system may break down. In this case, the precision of the absolute position is not accurately determined based on the determination of the difference value. Thus, the position precision determiner 115 does not determine (or prohibits the determination of) the difference value between the absolute position moving amount and the relative position moving amount in the predetermined time period after the external force equal to or higher than the threshold is detected until the reference position is reset. This embodiment compares a threshold for detecting the external force with the force that exceeds the holding torque of the focus driving motor 103 applied in the optical axis direction. Strictly speaking, there are a difference between the still frictional force and a motion frictional force and a temperature difference and a temperature change, and the holding torque has a different value according to the current driving direction of the focus lens 102. Hence, the strict comparison may be made based on these states.

Figure 11:
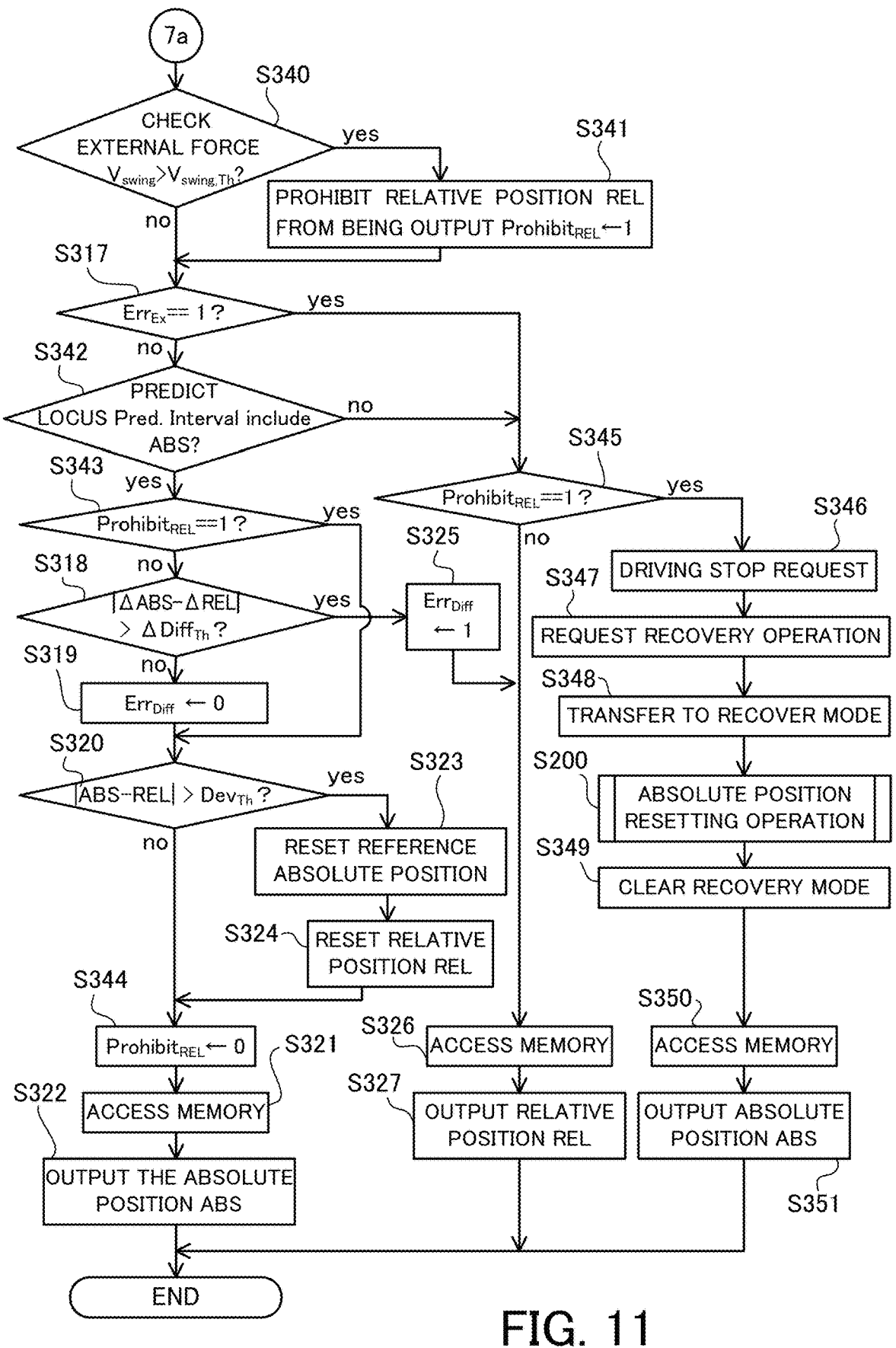
FIG. 11 is a flowchart of a post-startup process for a position detection apparatus according to the second embodiment.

Referring now to a flowchart illustrated in FIG. 11, a description will be given of a process flow after the startup operation of the position detection apparatus according to the second embodiment. A description of those steps which are corresponding steps in the first embodiment will be omitted. Reference numeral 7a in the flowchart in FIG. 11 is connected to reference numeral 7a in FIG. 7A. The steps S301 to S500 are the same as those described with reference to FIG. 7A in the first embodiment.

The final process in the flowchart in FIG. 11 is classified into three sub processes, i.e., outputting the absolute position as position information, outputting the relative position as position information, and outputting a stop request and performing a recovery process, according to a determination result of the position precision determiner 115. When the external force is permissible and the absolute position has a guaranteed precision calculated by each determination, the absolute position is output. When the external force is proper and the precision of the absolute position calculated by each determination is low, the relative position is output. When the external force is determined equal to or higher than the threshold, the absolute position is output if the other conditions are satisfied, and the recovery process follows.

When the step S500 as the subroutine moves to the step S340, the focus position detection controller 117 determines the external force. The focus position detection controller 117 makes the acceleration sensor 119 detect the external force applied to the interchangeable lens 100, and the image stabilization controller 120 extract a vector $V_{swing}$ in the optical axis direction based on the detected signal, and output the vector to focus position detector 107. The position precision determiner 115 in the focus position detector 107 compares it with the external force threshold $V_{swing,Th}$ previously stored the position detection memory 116. The procedure moves to the step S341 when the vector exceeds the threshold, and to the step S317 when the vector is equal to or lower than the threshold.

In the step S341, the focus position detection controller 117 sets a relative position REL output prohibition flag $Prohibit_{REL}$ to 1 so as to prohibit the relative position as the position information from being output because the external force equal to or higher than the threshold is detected in the optical axis direction. After the step S341 ends, the procedure moves to the step S317.

When the detected external force does not exceed the threshold, the focus position detection controller 117 predicts a driving locus of the absolute position described with reference to FIG. 10 in the step S342. When the absolute position calculated by the absolute position calculator 112 is located in an interval x as the prediction range, the position precision determiner 115 determines that the absolute position has a guaranteed precision and moves to the step S343. When the calculated absolute position is located outside of the interval x, the procedure moves to the step S345.

In the step S343, the focus position detection controller 117 determines the state of the relative position output prohibition flag $Prohibit_{REL}$. When the relative position output prohibition flag $Prohibit_{REL}$ is 1, the procedure moves to the step S320 that does not determine the difference value, and when the relative position output prohibition flag $Prohibit_{REL}$ is 0, the procedure moves to the step S318.

The relative position output prohibition flag $Prohibit_{REL}$ becomes 0 when the pattern is normally detected and the driving locus is normally predicted. At this time, the calculated absolute position has the guaranteed precision. Even when the relative position shifts due to the external force, the step S323 and S324 reset the relative position, and the relative position having the guaranteed precision can be calculated after the current cycle ends.

When the process moves from the step S320 or S324 to the step S344, the focus position detection controller 117 clears and zeros the relative position output prohibition flag $Prohibit_{REL}$. As described above, the relative position having the guaranteed precision can be obtained. Thereby, the output prohibition status of the relative position can be released. After the step S344 ends, the procedure moves to the step S321.

When the process moves from the step S317 or the step S342 to the step S345, the focus position detection controller 117 determines the state of the relative position output prohibition flag $Prohibit_{REL}$. When the relative position REL output prohibition flag $Prohibit_{REL}$ is 1, the relative position is prohibited from being output and the procedure moves to the step S346, and when the relative position REL output prohibition flag $Prohibit_{REL}$ is 0, the relative position is allowed to be output and the procedure moves to the step S318.

The steps S346 to S351 are performed when the absolute position is not determined both in the pattern abnormality detection and the prediction determination of the driving locus and when the relative position is prohibited from being output by the external force detection. In this case, there is no position information to be output and the recovery is performed by the absolute position resetting operation similar to that in the startup.

In the step S346, the focus position detection controller 117 outputs the driving stop request of the focus driving motor 103 to the focus controller 108. After the step S346 ends, the procedure moves to the step S347.

In the step S347, the focus position detection controller 117 outputs the recovery operation request to the focus controller 108. The focus position detection controller 117 outputs the position information of the optical infinity as provisional position information irrespective of the actual position of the focus lens 102. When the recovery operation request is output to the focus controller 108, the information is transmitted to the lens CPU 101, which in turns issues a driving control command to the focus controller 108 so as to execute the recovery operation. After the step S347 ends, the procedure moves to the step S348.

In the step S348, the focus position detection controller 117 moves to the recovery mode. The process in the step S348 is similar to the step S107 in the first embodiment, and a description thereof will be omitted. After the step S348 ends, the procedure moves to the step S200 as the subroutine. Due to the step S200, the focus position detection controller 117 searches the scale 105 for the reference position, and determines that the absolute position calculated by the absolute position calculator 112 has a guaranteed precision. After the step S200 ends, the procedure moves to the step S349.

In the step S349, the focus position detection controller 117 clears the recovery mode since the absolute position information is fixed by the recovery operation. After the step S349 ends, the procedure moves to the step S350.

In the step S350, the focus position detection controller 117 accesses the position detection memory 116. More specifically, the position detection memory 116 stores the absolute position calculated by the absolute position calculator 112, the relative position calculated by the relative position calculator 113, and the relative position detection signal. The position detection memory 116 further stores the pattern abnormality detection flags $Err_{EX}$ and $Err_{Ex*}$, the absolute position calculation flag $Err_{Diff}$, and the relative position output prohibition flag $Prohibit_{REL}$. After the step S350 ends, the procedure moves to the step S351.

In the step S351, the focus position detection controller 117 outputs as the position information the absolute position calculated by the absolute position calculator 112 to the focus controller 108. This process finishes a sequence for detecting and calculating the position of the focus lens 102, and for outputting the position information having the guaranteed precision. The focus position detector 107 repeats this sequence for each cycle of a predetermined time period, as long as the interchangeable lens 100 is electrified.

The interchangeable lens in the second embodiment may send a reset request to a camera body without executing the recovery process through an independent determination, and move to the recovery process based on a timing and determination (permission notice) of the camera body.

The second embodiment may provide a recovery process, when the position precision determiner 115 determines that the absolute position is imprecise and when an impact equal to or higher than the predetermined value is detected in detecting the external force. However, irrespective of the determination result of the position precision determiner 115, the recovery process may be performed when the impact equal to or higher than the predetermined value is detected in detecting the external force and the operation cannot be guaranteed.

The first and second embodiments express the binary determination result of the position precision determiner 115 based on the threshold, but may express a percentage determination result corresponding to a deviation amount or the like. For example, the position precision may be determined with a square mean value, an average, or a standard deviation of each component.

While the first and second embodiments apply the position detection apparatus to a lens apparatus and an image pickup apparatus (camera system), the present invention may be applied to a semiconductor inspection apparatus, a manufacturing apparatus, a machine tool, and another moving apparatus, which require highly precise positioning and velocity control.

Each of the embodiments can detect whether or not the absolute position detection apparatus becomes imprecise, and this detection enables proper position information to be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-174259, filed Sep. 4, 2015 which is hereby incorporated by reference herein in its entirety.

What is claimed is:

1. A position detection apparatus configured to detect a position of a test object, the position detection apparatus comprising:
   a scale in which a plurality of patterns are arranged at cycles different from one another;
   a sensor configured to detect light reflected from the scale and to output a plurality of signals corresponding to the detected light, the plurality of signals including a first signal corresponding to detected light reflected from the plurality of patterns of the scale and a second signal corresponding to detected light reflected from an area of the scale where the plurality of patterns is not provided;
   a memory; and
   a controller electrically connected to the memory and configured to perform:
      a first position calculating task configured to calculate an absolute position of the test object based on the first signal outputted by the sensor;
      a determining task configured to determine a precision of the absolute position of the test object, based on the second signal outputted by the sensor, by comparing a signal level obtained from the second signal with a predetermined threshold; and
      a controlling task configured to determine whether or not position information of the absolute position calculated by the first position calculating task is to be used based on a determination result of the determining task.

2. The position detection apparatus according to claim 1, wherein the controlling task outputs the absolute position of the test object calculated by the first position calculating task based on the first signal from the sensor when the determining task determines that the precision is equal to or higher than a predetermined level, and wherein the controlling task does not output the absolute position of the test object calculated by the first position calculating task based on the first signal from the sensor when the determining task determines that the precision is lower than the predetermined level.

3. The position detection apparatus according to claim 1, wherein the controlling task recalculates the absolute position, when the determining task determines that the precision is lower than a predetermined level.

4. The position detection apparatus according to claim 1,
wherein the controlling task sends a drive signal to a driver configured to drive the test object and searches for an object position at which the determining task determines that the precision is equal to or higher than a predetermined level, when the determining task determines that the precision is lower than a predetermined level, and
wherein the controlling task outputs the absolute position at which the determining task determines that the precision is equal to or higher than the predetermined level as a result of a search.

5. The position detection apparatus according to claim 1, wherein the determining task determines whether or not the plurality of patterns includes an abnormality, based on the second signal from the sensor, and determines that the precision of the absolute position of the test object calculated by the first position calculating task is lower than a predetermined level, when determining that the plurality of patterns includes the abnormality.

6. The position detection apparatus according to claim 5, wherein the determining task determines whether or not the plurality of patterns includes an abnormality, based on a noise component contained in the sensor.

7. The position detection apparatus according to claim 1,
wherein the controller is configured to further perform a second position calculating task configured to calculate a relative position of the test object relative to a reference position, and
wherein the controlling task sets as the reference position the absolute position calculated by the first position calculating task, and determines whether or not the relative position of the test object calculated by the second position calculating task is to be output, when the determining task determines that the precision of the absolute position calculated by the first position calculating task is lower than a predetermined level after the reference position is set.

8. The position detection apparatus according to claim 7, wherein the determining task determines whether or not the precision of the absolute position of the test object calculated by the first position calculating task is equal to or higher than a predetermined level, based on a difference between a moving amount of the relative position and a moving amount of the absolute position in a predetermined time period.

9. The position detection apparatus according to claim 7, wherein the second position calculating task calculates the relative position based on the first signal from the sensor for one of the plurality of patterns.

10. The position detection apparatus according to claim 7, wherein the controlling task resets the absolute position as the reference position when the determining task determines that the precision of the absolute position is equal to or higher than the predetermined level and that a difference between the absolute position and the relative position calculated by the second position calculating task is higher than a predetermined value.

11. The position detection apparatus according to claim 7, wherein the controlling task sets the reference position while the test object is stopped.

12. The position detection apparatus according to claim 7,
wherein the controlling task sends a drive signal to a driver configured to drive the test object, and searches for the absolute position at which the determining task determines that the precision is equal to or higher than the predetermined level, when the determining task determines that the precision is lower than a predetermined level, and
wherein the controlling task sets to the reference position the searched absolute position at which the determining task determines that the precision is equal to or higher than the predetermined level as a result of a search.

13. The position detection apparatus according to claim 12, wherein the controlling task sets an end position to the reference position, when the test object reaches the end position in a drivable range of the test object without finding a position at which the determining task determines that the precision is equal to or higher than the predetermined level.

14. The position detection apparatus according to claim 12, wherein the controlling task sends to the driver a signal for moving the test object to a position at which the search starts, after the reference position is searched for.

15. The position detection apparatus according to claim 1,
wherein the memory is further configured to store the absolute position calculated by the first position-calculating task, and
wherein the controlling task predicts a current absolute position based on a locus of the absolute position stored in the memory, and determines whether the current absolute position calculated by the first position calculating task is to be output, based on whether a range of the absolute position predicted by the controlling task includes the current absolute position calculated by the first position calculating task.

16. The position detection apparatus according to claim 1, wherein the signal level includes a deviation voltage of the second signal relative to the offset voltage of a premeasured abnormality detection signal.

17. A lens apparatus comprising:
an image pickup optical system; and
a position detection apparatus configured to detect a position of a test object that is at least one of optical elements in the image pickup optical systems,
wherein the position detection apparatus includes:
a scale in which a plurality of patterns are arranged at cycles different from one another;
a sensor configured to detect light reflected from the scale and to output a plurality of signals corresponding to the detected light, the plurality of signals including a first signal corresponding to detected light reflected from the plurality of patterns of the scale and a second signal corresponding to detected light reflected from an area of the scale where the plurality of patterns is not provided;
a memory; and
a controller electrically connected to the memory and configured to perform:
a first position calculating task configured to calculate an absolute position of the test object based on the first signal outputted by the sensor;
a determining task configured to determine a precision of the absolute position of the test object, based on the second signal outputted by the sensor, by comparing a signal level obtained from the second signal with a predetermined threshold; and a controlling task configured to determine whether or not position information of the absolute position calculated by the first position calculating task is to be used based on a determination result of the determining task.

18. An image pickup apparatus comprising:

an image pickup optical system;

a position detection apparatus configured to detect a position of a test object that is at least one of optical elements included in the image pickup optical systems; and an image sensor configured to photoelectrically convert light from the image pickup optical system, wherein the position detection apparatus includes:

a scale in which a plurality of patterns are arranged at cycles different from one another;

a sensor configured to detect light reflected from the scale and to output a plurality of signals corresponding to the detected light, the plurality of signals including a first signal corresponding to detected light reflected from the plurality of patterns of the scale and a second signal corresponding to detected light reflected from an area of the scale where the plurality of patterns is not provided;

a memory; and a controller electrically connected to the memory and configured to perform:

a first position calculating task configured to calculate an absolute position of the test object based on the first signal outputted by the sensor;

a determining task configured to determine a precision of the absolute position of the test object, based on the second signal outputted by the sensor, by comparing a signal level obtained from the second signal with a predetermined threshold; and a controlling task configured to determine whether or not position information of the absolute position calculated by the first position calculating task is to be used based on a determination result of the determining task.

19. The image pickup apparatus according to claim 18, further comprising a vibration detector configured to detect a vibration, wherein the controller is further configured to perform a second position calculating task configured to calculate a relative position of the test object based on the signal from the sensor, and wherein the controller prohibits the relative position calculated by the second position calculating task from being used, when the vibration detected by the vibration detector exceeds a predetermined value.

20. The image pickup apparatus according to claim 19, further comprising a driver configured to drive the test object, wherein the controller prohibits the relative position calculated by the second position calculating task from being used, when the vibration detector detects the vibration that provides a force larger than a force by which the driver holds the test object.

* * * * *